United States Patent
Tanabe et al.

(10) Patent No.: US 8,310,516 B2
(45) Date of Patent: *Nov. 13, 2012

(54) LIGHT SCANNING APPARATUS, LIGHT SCANNING METHOD, IMAGE FORMING APPARATUS, COLOR IMAGE FORMING APPARATUS, AND RECORDING MEDIUM HAVING PROGRAM

(75) Inventors: Jun Tanabe, Kanagawa (JP); Masaaki Ishida, Kanagawa (JP); Yasuhiro Nihei, Kanagawa (JP); Atsufumi Omori, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1408 days.

This patent is subject to a terminal disclaimer.

(21) Appl. No.: 11/913,558

(22) PCT Filed: Aug. 30, 2006

(86) PCT No.: PCT/JP2006/317596
§ 371 (c)(1),
(2), (4) Date: Nov. 5, 2007

(87) PCT Pub. No.: WO2007/105329
PCT Pub. Date: Sep. 20, 2007

(65) Prior Publication Data
US 2009/0091805 A1     Apr. 9, 2009

(30) Foreign Application Priority Data

Mar. 10, 2006  (JP) ................................. 2006-065154
Aug. 1, 2006   (JP) ................................. 2006-209840

(51) Int. Cl.
B41J 2/45  (2006.01)
B41J 2/47  (2006.01)
(52) U.S. Cl. ........................................ 347/253; 347/238
(58) Field of Classification Search .................. 347/131, 347/143–145, 238–240, 251–254
See application file for complete search history.

(56) References Cited

U.S. PATENT DOCUMENTS

| 5,848,087 A | 12/1998 | Iwasa et al. |
| 6,731,317 B2 * | 5/2004 | Ema et al. ..................... 347/135 |
| 7,826,110 B2 * | 11/2010 | Tanabe et al. ................ 358/509 |
| 2007/0132828 A1 | 6/2007 | Ishida et al. |

FOREIGN PATENT DOCUMENTS

EP   0 659 011   9/1994
(Continued)

OTHER PUBLICATIONS

U.S. Appl. No. 11/763,062, filed Jun. 14, 2007, Tanabe, et al.

*Primary Examiner* — Hai C Pham
(74) *Attorney, Agent, or Firm* — Oblon, Spivak, McClelland, Maier & Neustadt, L.L.P.

(57) ABSTRACT

A light scanning apparatus having plural light sources includes a light source control unit configured to control the light sources to form L (L≧2) light beam arrays aligned in a sub scanning direction each of which L light beam arrays are formed by causing M ((N−1)≧M≧1) light sources out of N (N≧2) light sources assigned to each of the L light beam arrays to emit light as M light emitting sources, wherein each of the L light beam arrays forms a pixel and a total of L pixels aligned in the sub scanning direction are formed.

15 Claims, 29 Drawing Sheets

FOREIGN PATENT DOCUMENTS

| | | |
|---|---|---|
| JP | 2001-272615 | 10/2001 |
| JP | 2001-350111 | 12/2001 |
| JP | 2003-072135 | 3/2003 |
| JP | 2003-186278 | 7/2003 |
| JP | 2005231327 A * | 9/2005 |
| JP | 2005234510 A * | 9/2005 |

* cited by examiner

FIG.17

|  | LIGHT SOURCE A | LIGHT SOURCE B |
|---|---|---|
| PATTERN 1 | 0 | 8 |
| PATTERN 2 | 2 | 6 |
| PATTERN 3 | 3 | 5 |
| PATTERN 4 | 4 | 4 |
| PATTERN 5 | 5 | 3 |
| PATTERN 6 | 6 | 2 |
| PATTERN 7 | 8 | 0 |

LIGHT SCANNING APPARATUS, LIGHT SCANNING METHOD, IMAGE FORMING APPARATUS, COLOR IMAGE FORMING APPARATUS, AND RECORDING MEDIUM HAVING PROGRAM

TECHNICAL FIELD

The present invention generally relates to a light scanning apparatus, a light scanning method, an image forming apparatus, a color image forming apparatus, and a recording medium having a program, and more particularly relates to a light scanning apparatus, a light scanning method, an image forming apparatus, a color image forming apparatus, and a recording medium having a program that use plural light sources and can precisely correct the position of a pixel in the sub-scanning direction.

BACKGROUND ART

FIG. 32 is a block diagram illustrating an exemplary configuration of an electrophotographic image forming apparatus such as a laser printer or a digital copier. As shown in FIG. 32, a laser beam emitted from a semiconductor laser unit 1001 used as a light source unit is deflected and scanned by a rotating polygon mirror 1002, passes through a scanning lens (fθ lens) 1003, and forms a light spot on a photoconductor 1004, thereby exposing the photoconductor 1004 and forming an electrostatic latent image. A phase-locked loop 1009 synchronizes the phase of a modulation signal generated by a clock generation circuit 1008 with that of an output signal from a photodetector 1005 that detects the laser beam deflected by the polygon mirror 1002. More specifically, the phase-locked loop 1009 generates a phase-synchronized image clock (pixel clock) for each line based on the output signal from the photodetector 1005 and supplies the generated phase-synchronized image clock to an image processing unit 1006 and a laser driving circuit 1007. The laser driving circuit 1007 controls the laser emission time of the semiconductor laser unit 1001 according to image data generated by the image processing unit 1006 and the phase-synchronized image clock generated by the phase-locked loop 1009 for each line, thereby controlling the formation of an electrostatic latent image on the photoconductor 1004.

In recent years, increasing demands for higher printing speed (image forming speed) and higher image quality have been satisfied by increasing the rotating speed of a polygon motor used as a deflector and the frequency of a pixel clock used as a base clock for laser modulation. However, further improvements in printing speed and image quality would be difficult with such conventional methods.

For the above reason, multibeam technologies using plural light sources have been developed to achieve higher printing speed and image quality. A light scanning method using a multibeam technology increases the number of light beams that can be deflected and scanned by a deflector at a time. Such a light scanning method enables decreasing the rotating speed of a polygon motor used as a deflector and the frequency of a pixel clock, thereby making it possible to provide faster and more stable light scanning and image forming.

As a semiconductor laser unit or light sources for providing plural light beams in a multibeam technology, a combination of single-beam laser chips or an LD (laser diode) array having plural light-emitting elements on a single laser chip is being used.

Such a semiconductor laser unit, for example, an LD array, for providing plural light beams is very compact, can perform direct modulation at a very high speed using a driving current, and therefore is being widely used as light sources for a laser printer or the like in recent years. However, since the light output of a semiconductor laser at a driving current fluctuates depending on the temperature, it is difficult to set the light intensity of a semiconductor laser at a specific value. Especially, in a surface emitting laser array having plural light sources on a single chip, since the distances between the light sources are short, temperature changes caused by light emission and extinction and temperature cross-talk cause the amount of light emitted from the light sources to fluctuate.

Patent document 1 discloses a light scanning apparatus having a two-dimensional array of plural light sources that scans a photoconductor by deflecting plural light beams with a deflector. According to an embodiment in patent document 1, the density of light emitting points can be maximized without causing temperature cross-talk between the light emitting points.

Patent document 2 discloses an image forming apparatus using surface emitting lasers. An embodiment in patent document 2 makes it possible to change light intensity of each laser chip pixel-by-pixel and to control the light emission time of each laser chip pixel-by-pixel, thereby making it possible to control the formation of an electrostatic latent image of pixels.

Patent document 3 discloses a light scanning apparatus using surface emitting lasers. An embodiment in patent document 3 obviates the problem of heat cross-talk using a specific arrangement of light sources and thereby makes it possible to form a high-density image.

[Patent document 1] Japanese Patent Application Publication No. 2001-272615
[Patent document 2] Japanese Patent Application Publication No. 2003-72135
[Patent document 3] Japanese Patent Application Publication No. 2001-350111

However, in a conventional light scanning apparatus having plural light sources, since one pixel is normally formed with one light source, it is difficult to correct the position of a pixel with an accuracy higher than the size of the pixel.

DISCLOSURE OF THE INVENTION

The present invention provides a light scanning apparatus, a light scanning method, an image forming apparatus, a color image forming apparatus, and a recording medium having a program that substantially obviate one or more problems caused by the limitations and disadvantages of the related art.

Embodiments of the present invention provide a light scanning apparatus, a light scanning method, an image forming apparatus, a color image forming apparatus, and a recording medium having a program that use plural light sources and can precisely (with an accuracy higher than the pixel density in the sub scanning direction) correct the position of a pixel in the sub-scanning direction.

According to an embodiment of the present invention, a light scanning apparatus having plural light sources, includes a light source control unit configured to control the light sources to form L (L≧2) light beam arrays aligned in a sub scanning direction each of which L light beam arrays are formed by causing M ((N−1)≧M≧1) light sources (M light emitting sources) out of N (N≧2) light sources assigned to each of the L light beam arrays to emit light, wherein each of the L light beam arrays forms a pixel and a total of L pixels aligned in the sub scanning direction are formed.

According to another embodiment of the present invention, a light scanning method using plural light sources includes the step of controlling the light sources to form L (L≧2) light beam arrays aligned in a sub scanning direction each of which L light beam arrays are formed by causing M ((N−1)≧M≧1) light sources (M light emitting sources) out of N (N≧2) light sources assigned to each of the L light beam arrays to emit light, wherein each of the L light beam arrays forms a pixel and a total of L pixels aligned in the sub scanning direction are formed.

Still another embodiment of the present invention provides a recording medium having a program embodied therein for causing a computer to control plural light sources, said program includes a light source control code unit configured to control the light sources to form L (L≧2) light beam arrays aligned in a sub scanning direction each of which L light beam arrays are formed by causing M ((N−1)≧M≧1) light sources (M light emitting sources) out of N (N≧2) light sources assigned to each of the L light beam arrays to emit light, wherein each of the L light beam arrays forms a pixel and a total of L pixels aligned in the sub scanning direction are formed.

As described above, embodiments of the present invention make it possible to control plural light sources to form L (L≧2) light beam arrays aligned in a sub scanning direction each of which L light beam arrays are formed by causing M ((N−1)≧M≧1) light sources (M light emitting sources) out of N (N≧2) light sources assigned to each of the L light beam arrays to emit light, wherein each of the L light beam arrays forms a pixel and a total of L pixels aligned in the sub scanning direction are formed.

BRIEF DESCRIPTION OF THE DRAWINGS

FIG. 17 is a table used to describe an exemplary process by a light source control unit of changing light emission time of light sources;

BEST MODE FOR CARRYING OUT THE INVENTION

Preferred embodiments of the present invention are described below with reference to the accompanying drawings. In the present invention, a pixel means a simple pixel (for example, a pixel in a 1,200 dpi image has a size of 21 μm square) and does not refer to a compound pixel made up of plural pixels (for example, 4×4 pixels) as in a dithering technique.

Figure 1:
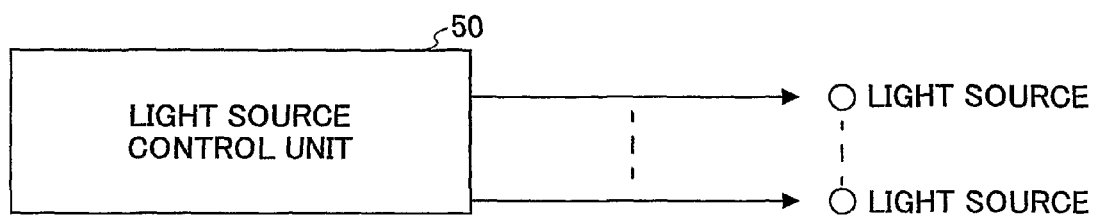
FIG. 1 is a drawing illustrating an exemplary configuration of a light scanning apparatus according to an embodiment of the present invention.

FIG. 1 is a drawing illustrating an exemplary configuration of a light scanning apparatus according to an embodiment of the present invention. As shown in FIG. 1, a light scanning apparatus according to an embodiment of the present invention (a light scanning apparatus that scans plural light beams from plural light sources in the main scanning direction) includes a light source control unit 50 that controls plural light sources. When plural light sources (for example, a two-dimensional array of plural light sources) are used, the arrangement of light emitting points of the light sources and the arrangement of light beams from the light sources may not always correspond. Therefore, in the descriptions below, an array of light beams aligned in a sub scanning direction is called a virtual light source array and each of the light beams is called a virtual light source. A virtual light source array consists of N (N≧2) virtual light sources aligned in the sub scanning direction. The light source control unit 50 controls the light sources to form L (L≧2) virtual light source arrays aligned in the sub scanning direction, causes M ((N−1)≧M≧1) light sources (M light emitting sources) out of N light sources corresponding to N virtual light sources in each of the L virtual light source arrays to emit light to form a pixel and thereby to form a total of L pixels aligned in the sub scanning direction.

A light scanning apparatus according to an embodiment of the present invention is described below in more detail.

Figure 32:
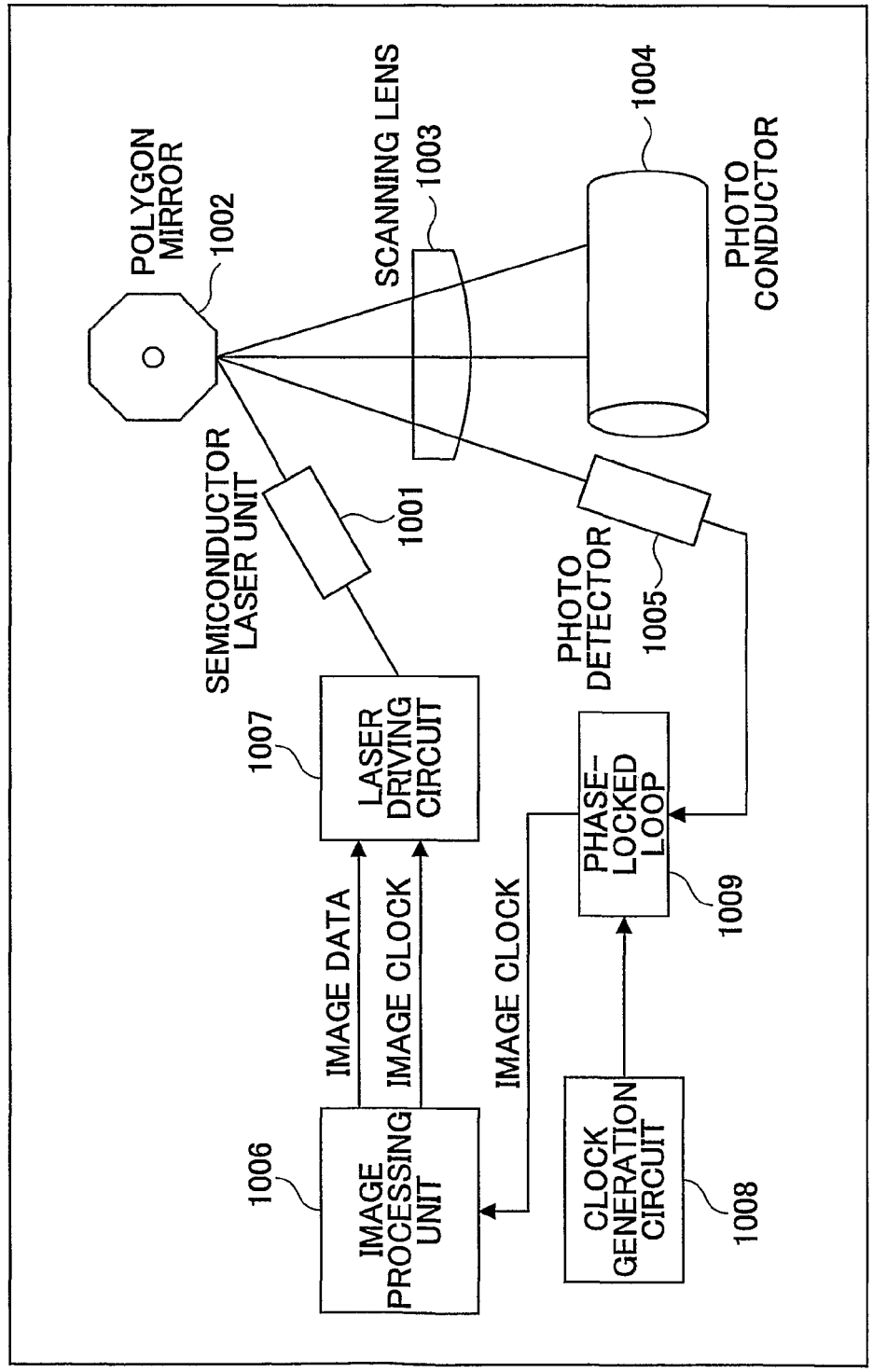
FIG. 32 is a drawing illustrating an exemplary configuration of a conventional image forming apparatus.

Assume that the semiconductor laser unit 1001 in a conventional image forming apparatus (writing optical system) shown in FIG. 32 is a semiconductor laser array where plural light sources (plural semiconductor lasers) are arranged in a grid or a surface emitting laser array where plural light sources (plural vertical cavity surface emitting lasers (VCSEL)) are arranged on a single chip in a grid. The semiconductor laser unit 1001 is positioned as shown in FIG. 2 so that the array direction of the plural light sources forms an angle θ with the rotation axis of a deflector, for example, the polygon mirror 1002 shown in FIG. 32.

Figure 2:
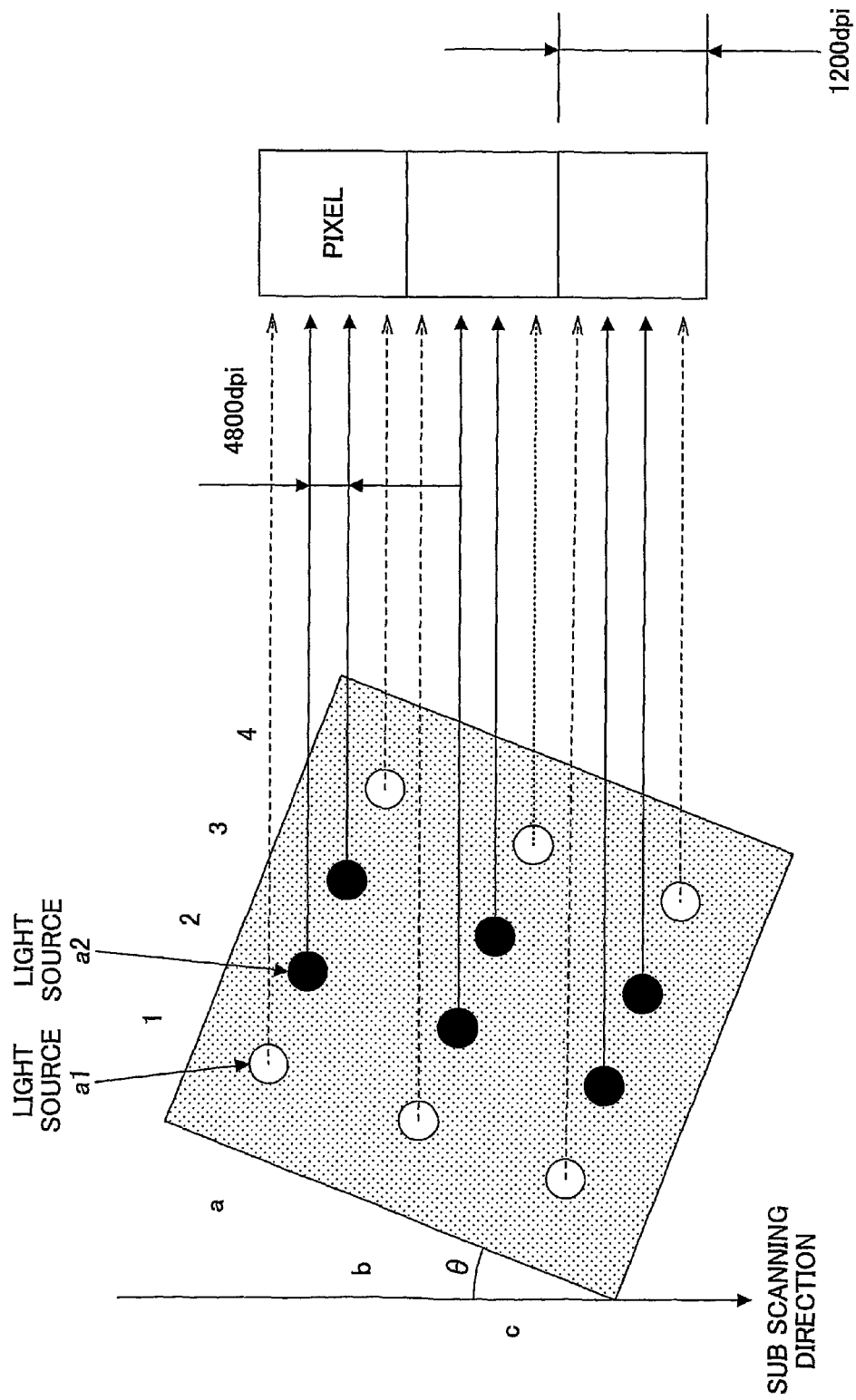
FIG. 2 is a drawing illustrating an exemplary light source unit.

In FIG. 2, the four light sources in column a in the laser array are called light sources a1, a2, a3, and a4 from the left. Take, for example, a case where the light source control unit 50 causes the light sources a2 and a3 out of the light sources a1, a2, a3, and a4 to emit light and thereby to form a pixel (one pixel is formed by one virtual light source array formed by four light sources). When the pixel density to be achieved is 1,200 dpi, the distance between the two light sources corresponds to the distance between two pixels in a 4,800 dpi image. In other words, the density of light sources is four times higher than the pixel density. Such a configuration makes it possible to shift the centroid of a pixel in the sub scanning direction by changing the proportions of the amounts of light from the light sources forming the pixel, thereby making it possible to form a pixel with an accuracy higher than the density of light sources.

In FIG. 2 and subsequent figures, a white circle indicates a light source not emitting light and a black circle indicates a light source emitting light. In an example shown in FIG. 2, the light source control unit 50 causes the light sources a2 and a3 out of the light sources a1, a2, a3, and a4 in column a to emit light and thereby to form the first pixel; causes the light sources b2 and b3 out of the light sources b1, b2, b3, and b4 in column b to emit light and thereby to form the second pixel; and causes the light sources c2 and c3 out of the light sources c1, c2, c3, and c4 in column c to emit light and thereby to form the third pixel.

Figure 3:
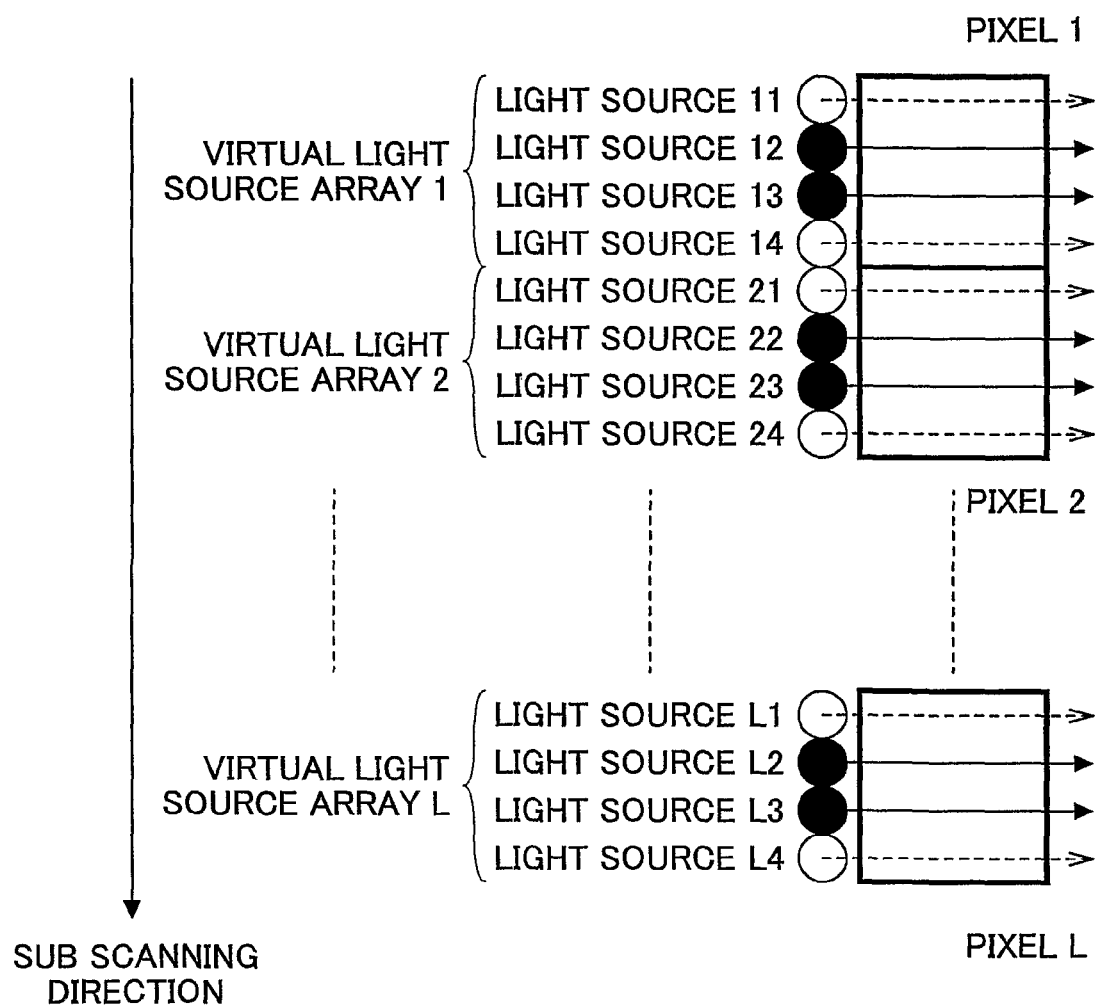
FIG. 3 is a drawing illustrating exemplary virtual light source arrays 1 through L aligned in the sub scanning direction to form L pixels.

In an example shown in FIG. 3, the light source control unit 50 causes two light sources out of four light sources to emit light, the scanning positions (positions that are scanned by the laser beams emitted from light sources) of which two light sources are adjacent to each other in the sub scanning direction (in FIG. 2, two light sources in the middle of each column). The light source control unit 50 forms virtual light source arrays 1 through L aligned in the sub scanning direction, thereby forming L pixels. In the example shown in FIG. 3, the total number of light sources is four times L.

Forming one pixel with two or more light sources (two light sources in FIGS. 2 and 3) is preferable because of the reason as described below. When surface emitting lasers are used as light sources, since the output power of a surface emitting laser is lower than a conventional laser, one light source may not be enough to provide a sufficient amount of light to develop a pixel. Therefore, to obtain a sufficient amount of light to develop a pixel, it is preferable to use two or more light sources.

Figure 4:
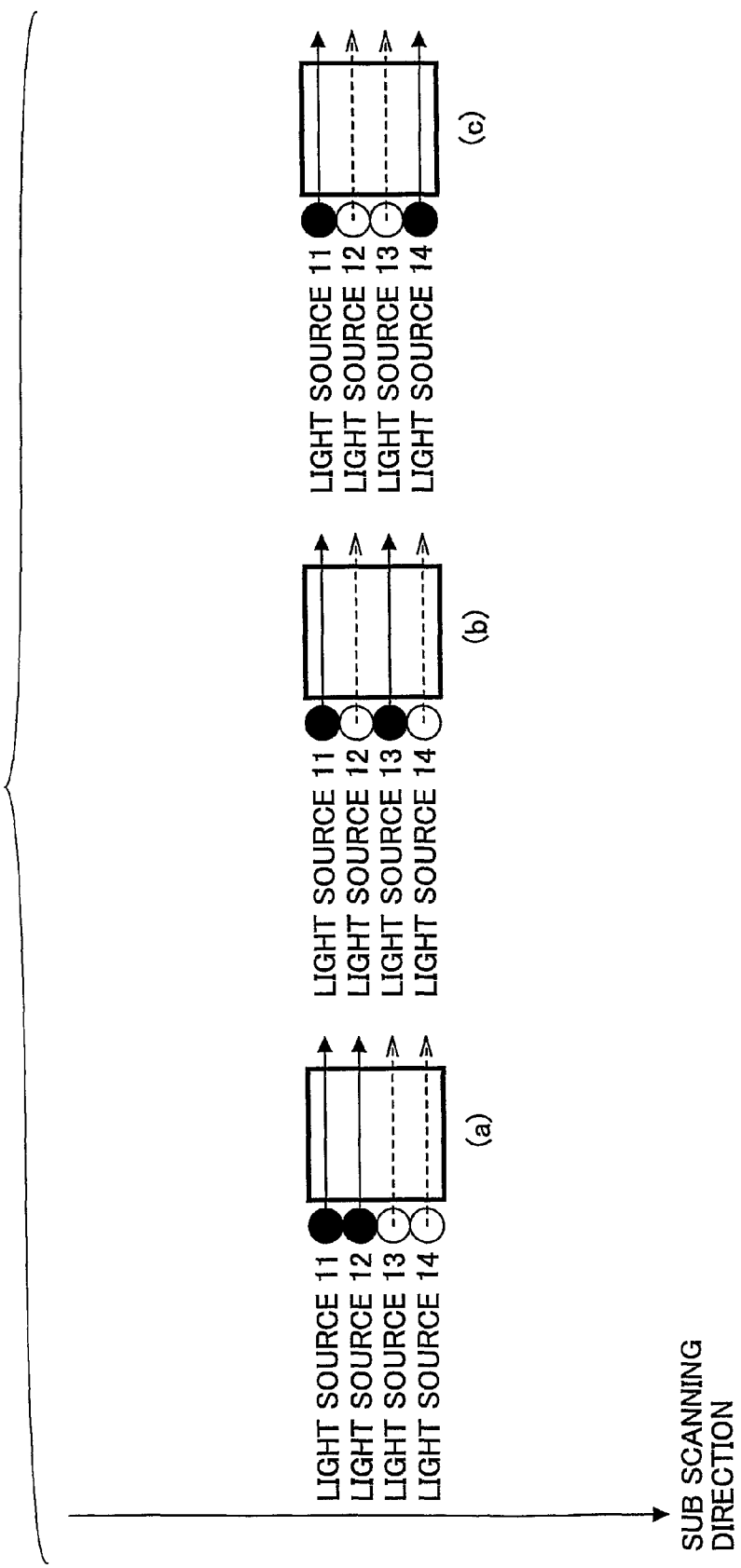
FIG. 4 is a drawing illustrating three patterns (a), (b), and (c) of selecting two light sources out of four light sources.
Figure 5:
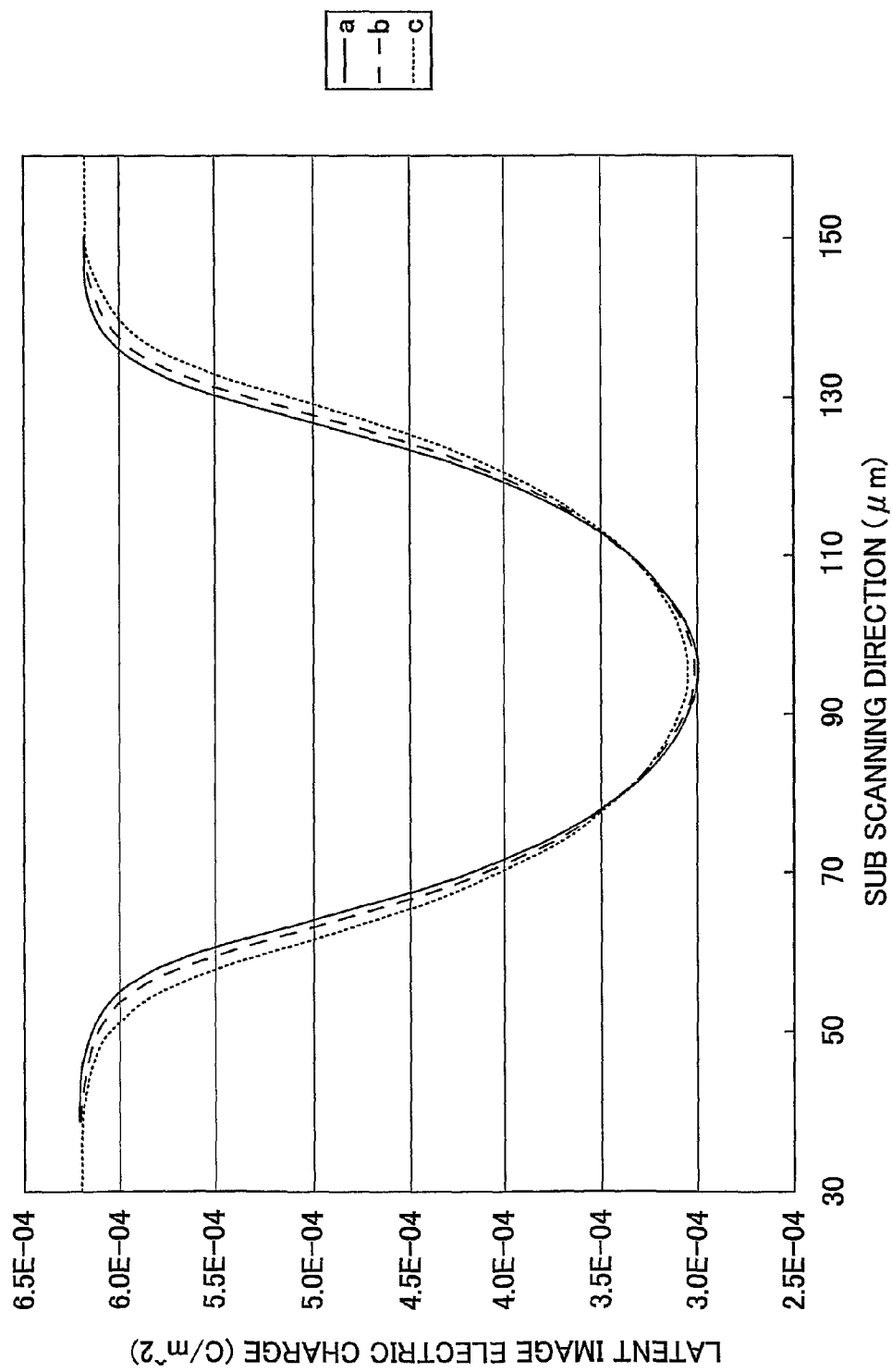
FIG. 5 is a graph showing the results of an electrostatic latent image forming simulation using the patterns (a), (b), and (c) shown in FIG. 4.

The advantage of causing two light sources the scanning positions of which are adjacent to each other in the sub scanning direction to emit light is described below. FIG. 4 shows three patterns (a), (b), and (c) of selecting two light sources out of four light sources. The distance between the two selected light sources is different in each pattern and is narrowest in the pattern (a). FIG. 5 is a graph showing the results of an electrostatic latent image forming simulation using the patterns (a), (b), and (c) shown in FIG. 4. As shown in FIG. 5, the electrostatic latent image formed using the pattern (a) has the narrowest latent image electric charge distribution. The results shown in FIG. 5 suggest that using light sources the scanning positions of which are adjacent to each other in the sub scanning direction (so that the distance between the scanning positions becomes the narrowest) results in higher resolution.

Figure 6:
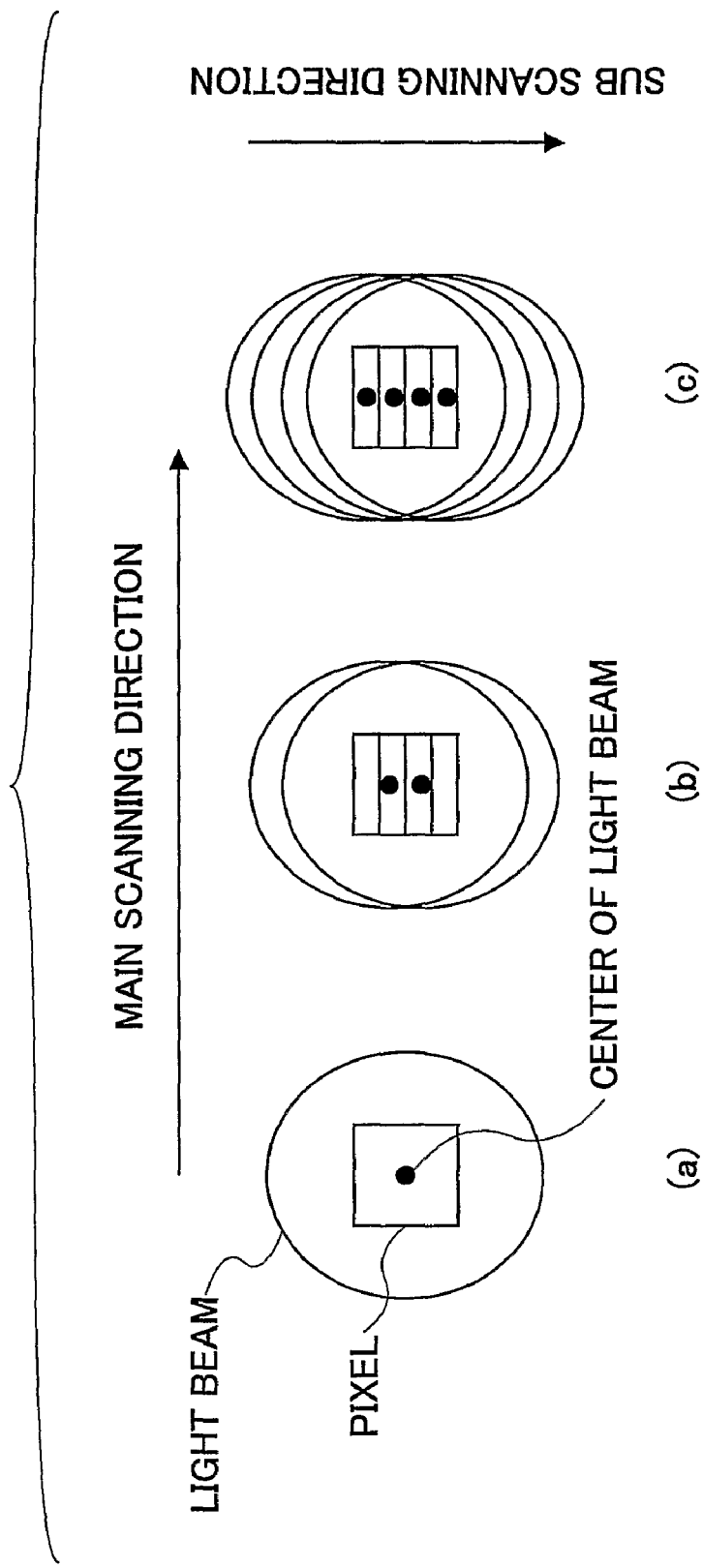
FIG. 6 is a drawing used to describe the advantage of forming a pixel by causing M ((N−1)≧M) light sources (M light emitting sources) the scanning positions of which are adjacent to each other in the sub scanning direction to emit light.

Also, when a virtual light source array consists of N (N≧2) light sources that can scan different positions in the sub scanning direction, it is preferable to cause M ((N−1)≧M) light sources (M light emitting sources) the scanning positions of which are adjacent to each other in the sub scanning direction to emit light to form a pixel rather than causing all N light sources to emit light. An advantage of the above method is described below. FIG. 6 shows three patterns (a), (b), and (c) of forming a pixel: in pattern (a), one light source is used as in a conventional light scanning apparatus; in pattern (b), two light sources in the middle of four light sources aligned in the sub scanning direction are used; and in pattern (c), all four light sources aligned in the sub scanning direction are used. In FIG. 6, it is assumed that the amount of light (number of light sources×light output of each light source) used to form a pixel is the same in all three patterns. Also, the beam diameter (light intensity becomes less than or equal to $1/e^2$ of the maximum light intensity outside of a circle with this diameter) of a light beam emitted from each light source is longer than a side of a pixel. When plural light sources are used, the light spots of light beams emitted from the light sources are overlapped.

Figure 7:
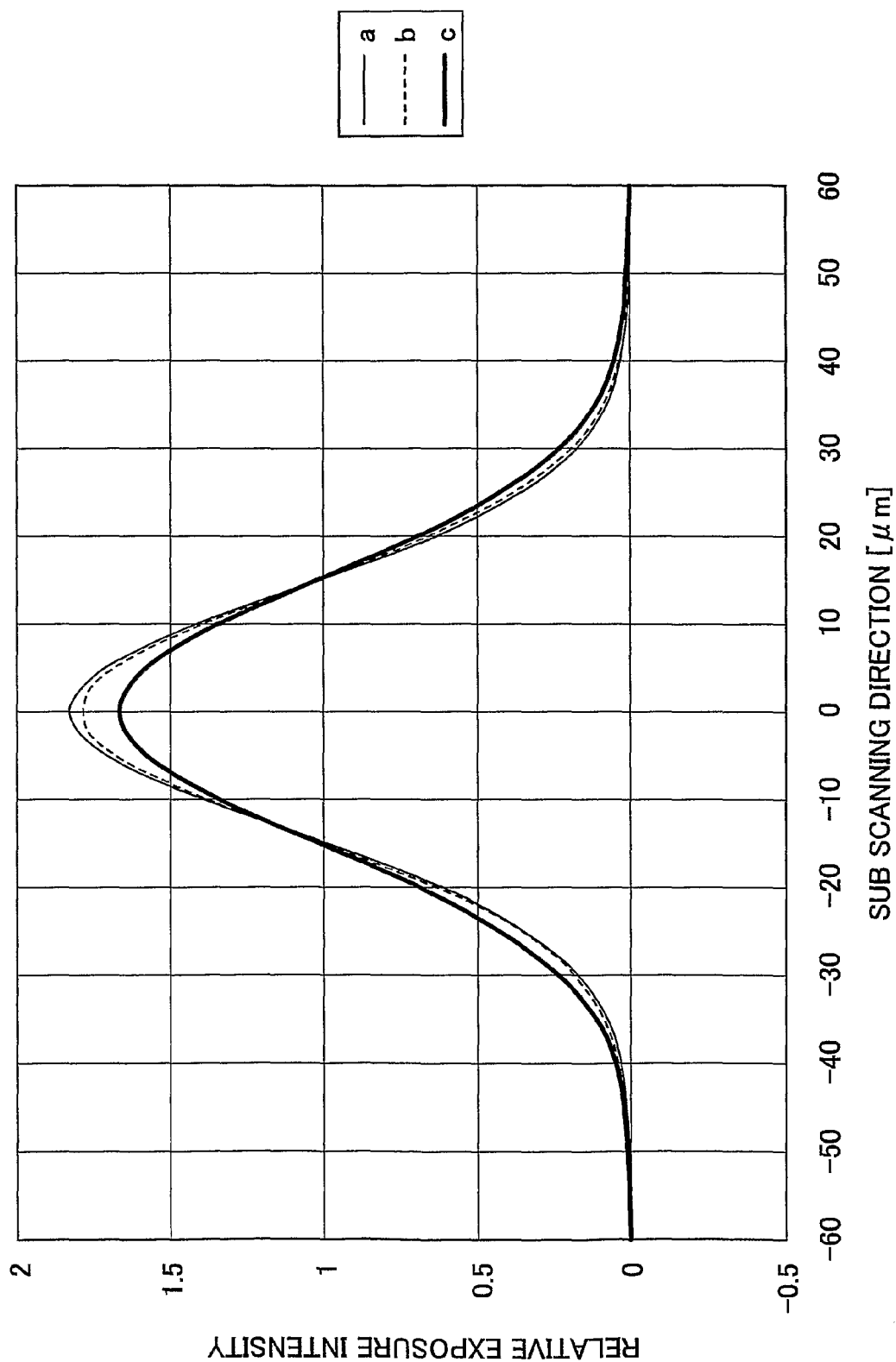
FIG. 7 is a graph showing exposure intensity distributions obtained using the patterns (a), (b), and (c) shown in FIG. 6.

FIG. 7 is a graph showing exposure intensity distributions obtained using the patterns (a), (b), and (c) shown in FIG. 6. As shown in FIG. 7, when two light sources in the middle of four light sources arranged in the sub scanning direction are used to form a pixel, the resulting exposure intensity distribution is substantially the same as that obtained by forming a pixel using one light source. On the other hand, when all four light sources arranged in the sub scanning direction are used to form a pixel, the exposure intensity distribution and the electrostatic latent image becomes wider, and as a result, the pixel accuracy becomes lower.

The above results suggest that providing N (N≧2) light sources in the sub scanning direction for each pixel and selecting M ((N−1)≧M) light sources (M light emitting sources) out of N light sources prevent the exposure intensity distribution and the electrostatic latent image from becoming wider in the sub scanning direction and make it possible to correct the position of a pixel in the sub scanning direction with an accuracy higher than the size of the pixel.

Figure 8:
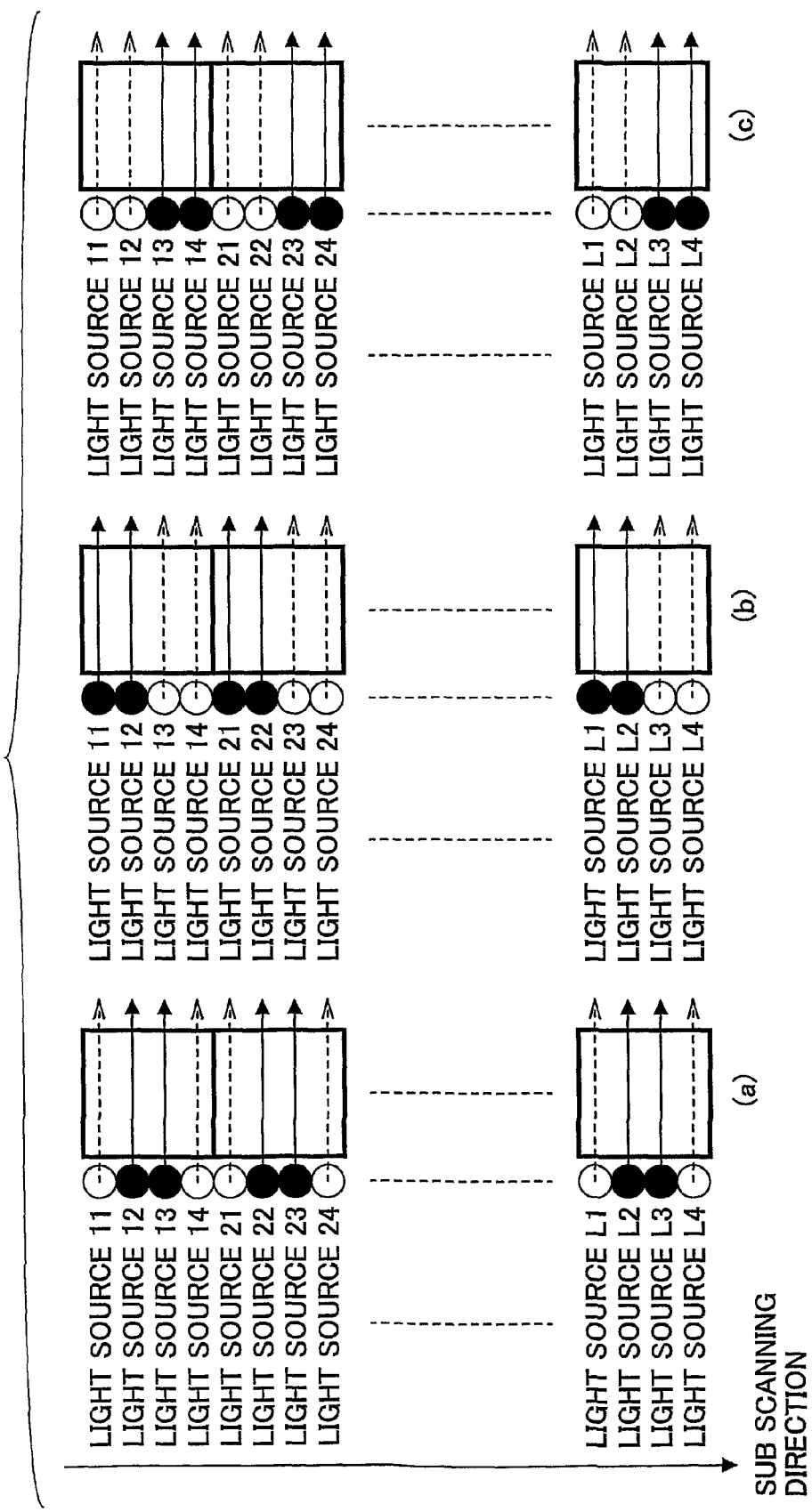
FIG. 8 is a drawing used to describe an exemplary process of correcting the positions of pixels.

According to embodiments of the present invention, two light sources the scanning positions of which are adjacent to each other in the sub scanning direction are used as shown in FIG. 8. When pixels are positioned correctly in the sub scanning direction, two middle light sources (light sources 12 and 13, 22 and 23 . . . and L2 and L3) the scanning positions of which are adjacent to each other in the sub scanning direction are caused to emit light out of each four light sources as shown in FIG. 8 (a). When pixels are misaligned downward, two upper light sources (light sources 11 and 12, 21 and 22, . . . and L1 and L2) the scanning positions of which are adjacent to each other in the sub scanning direction are caused to emit light as shown in FIG. 8 (b) to correct the positions of the pixels. When pixels are misaligned upward, two lower light sources (light sources 13 and 14, 23 and 24, . . . and L3 and L4) the scanning positions of which are adjacent to each other in the sub scanning direction are caused to emit light as shown in FIG. 8 (c) to correct the positions of the pixels.

As described above, in a light scanning apparatus according to an embodiment of the present invention, when $(N-1) \geq M \geq 2$ is true, the scanning positions of the selected M light emitting sources are preferably adjacent to each other in the sub scanning direction.

Also, in a light scanning apparatus according to an embodiment of the present invention, the light source control unit 50 may be configured to control M light emitting sources to shift the centroid of a pixel in the sub scanning direction.

Figure 9:
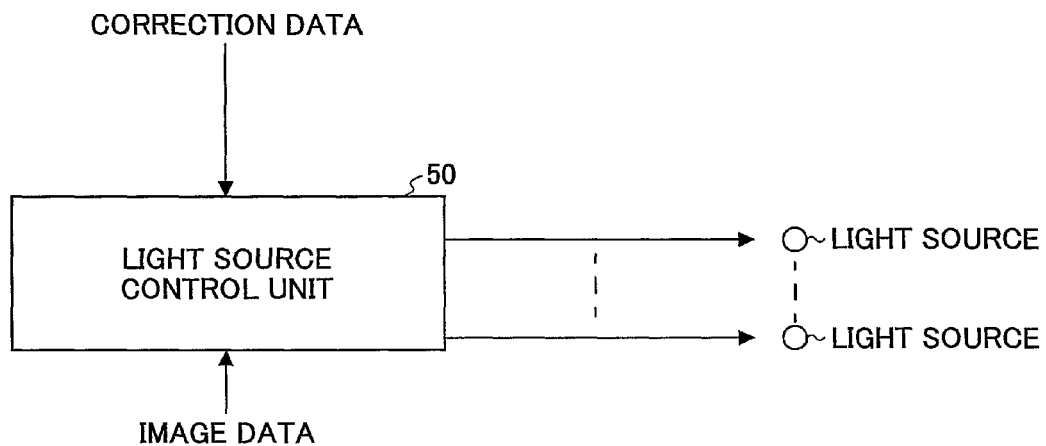
FIG. 9 is a block diagram illustrating an exemplary configuration of a light scanning apparatus according to an embodiment of the present invention.

More specifically, as shown in FIG. 9, the light source control unit 50 may be configured to control M light emitting sources to shift the centroid of a pixel a distance in the sub scanning direction according to correction data containing information to correct the position of the centroid of the pixel in the sub scanning direction.

Figure 10:
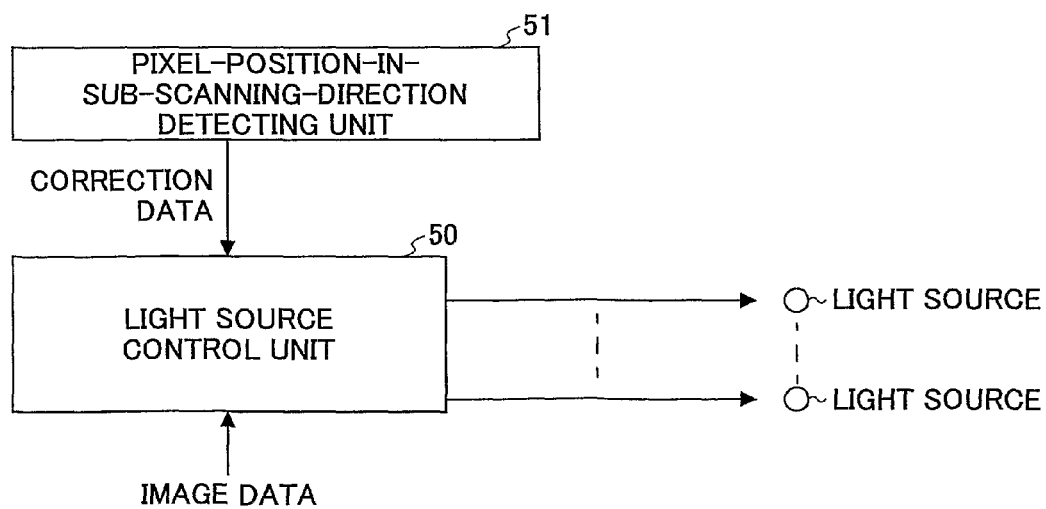
FIG. 10 is a block diagram illustrating an exemplary configuration of a light scanning apparatus according to an embodiment of the present invention.

As shown in FIG. 10, a light scanning apparatus according to an embodiment of the present invention may include a pixel-position-in-sub-scanning-direction detecting unit 51 that detects the position of a pixel in the sub scanning direction and generates correction data containing information to correct the position of the centroid of the pixel in the sub scanning direction. In this case, the light source control unit 50 may be configured to control M light emitting sources to shift the centroid of a pixel a distance in the sub scanning direction according to the correction data generated by the pixel-position-in-sub-scanning-direction detecting unit 51.

The pixel-position-in-sub-scanning-direction detecting unit 51 may be implemented by using a technology disclosed in Japanese Patent No. 3644923.

A color image forming apparatus disclosed in Japanese Patent No. 3644923 includes two or more image forming units arranged along the conveying direction of a conveyor belt each of which image forming units is configured to form an image of a different color; three or more sensors aligned in the main scanning direction perpendicular to the conveying direction of the conveyor belt so as to cover the center and both sides of the main scanning direction; a toner mark forming unit configured to cause the image forming unit to form position detection toner marks of different colors in positions on the conveyor belt which positions corresponding to the positions of the sensors, and a misalignment distance detection unit configured to detect the misalignment distance of a color from a base color at each sensor position based on the output from a corresponding sensor that reads the corresponding position detection toner mark. This misalignment distance detection unit may be used as the pixel-position-in-sub-scanning-direction detecting unit 51 of an embodiment of the present invention.

More accurately, the pixel-position-in-sub-scanning-direction detecting unit 51 according to an embodiment of the present invention is configured to generate correction data containing information to correct the position of the centroid of a pixel in the sub scanning direction based on the misalignment distance detected by the misalignment distance detection unit disclosed in Japanese Patent No. 3644923.

As described earlier, according to an embodiment of the present invention, the light source control unit 50 controls M light emitting sources to shift the centroid of a pixel in the sub scanning direction as shown in FIG. 8. The present invention also provides other methods of controlling M light emitting sources to shift the centroid of a pixel in the sub scanning direction. For example, the light source control unit 50 may be configured to change the proportions of the light emission time of M $((N-1) \geq M \geq 2)$ light sources (M light emitting sources) while not changing the total light emission time or the total exposure area of the M light emitting sources. Also, the light source control unit 50 may be configured to change the proportions of the light emission levels of M light emitting sources and thereby to change the proportions of the exposure energy of the M light emitting sources while not changing the total exposure energy of the M light emitting sources.

FIGS. 11 through 15 are drawings used to describe exemplary methods of controlling M $((N-1) \geq M \geq 2)$ light sources by the light source control unit 50.

Figure 11:
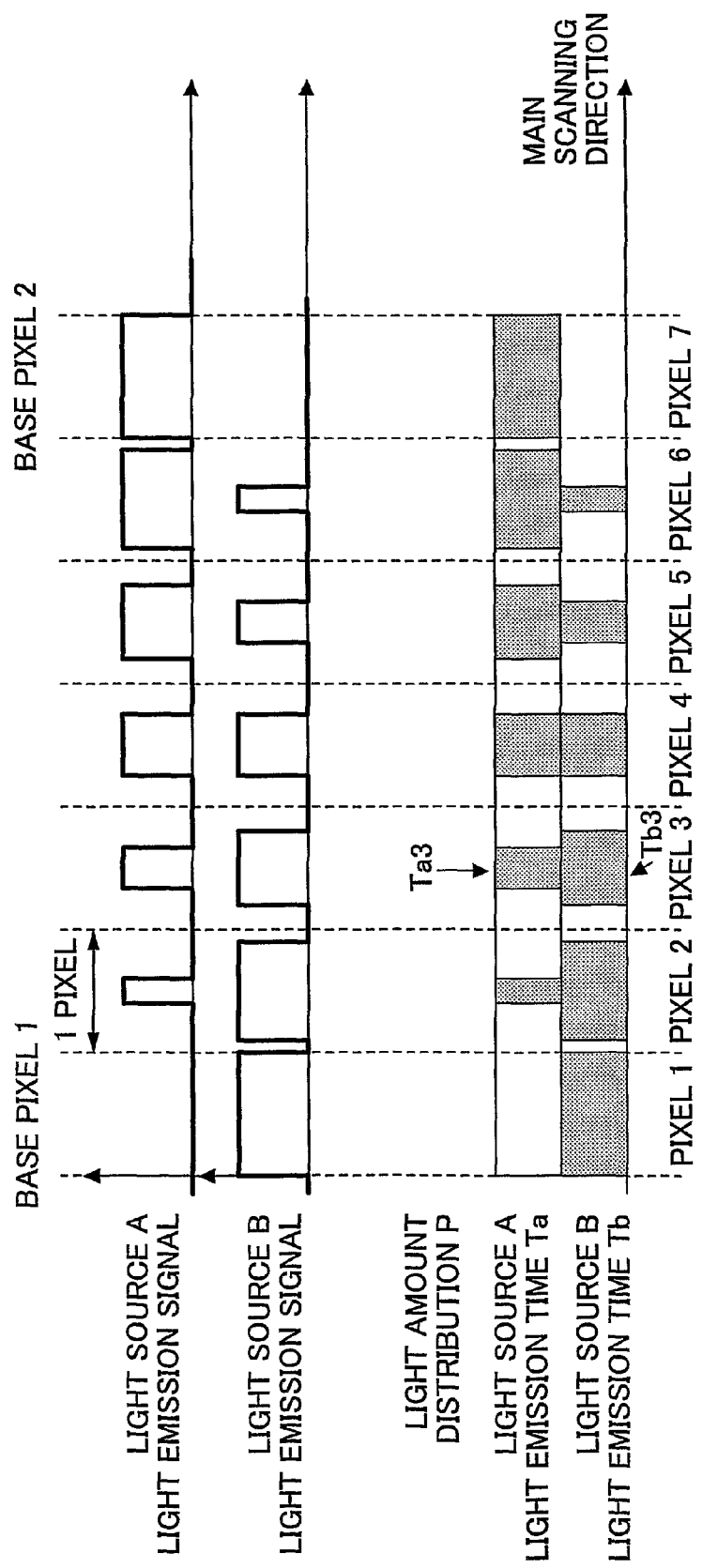
FIG. 11 is a drawing used to describe an exemplary method of controlling M light emitting sources to shift the centroid of a pixel in the sub scanning direction.

FIG. 11 is a drawing used to describe an exemplary method of controlling M light emitting sources to shift the centroid of a pixel in the sub scanning direction, where the proportions of the light emission time of the M light emitting sources are changed while not changing the total light emission time of the M light emitting sources. In FIG. 11, M light emitting sources are composed of light sources A and B. Light emission signals of the light sources A and B are shown in the upper part of the drawing and the light amount distribution formed by light beams scanned by the light sources A and B onto a photoconductor is shown in the lower part of the drawing with the rightward direction being the main scanning direction.

Assume that the light source a2 shown in FIG. 2 corresponds to the light source A shown in FIG. 11 and the light source a3 corresponds to the light source B. For pixel 1, only the light source B emits light. For pixels 2 through 7, the light emission time of the light source B becomes gradually shorter and the light emission time of the light source A becomes longer. For pixel 4, the light emission time of the light sources A and B is the same. When pixel 4 is assumed as a base pixel, the centroids of the pixels 5, 6, and 7 are misaligned in the upward sub scanning direction or upward direction in FIG. 11. On the other hand, the centroids of the pixels 1, 2, and 3 are misaligned in the downward sub scanning direction or downward direction in FIG. 11. The centroids of the pixels can be shifted in the sub scanning direction by changing the proportions of the light emission time of the light sources A and B while not changing the total light emission time. Take pixel 3 for example. When the light emission time of the light source A is Ta3 and the light emission time of the light source B is Tb3, the proportions of the light emission time of the light sources A and B are changed so that Tall (total light emission time)=Ta3+Tb3=Tan+Tbn (n is a natural number) is true. For example, the misalignment distance detection unit disclosed in Japanese Patent No. 3644923 can be used to measure by patch measurement the distance of misalignment of a toner image in the sub scanning direction. The pixel-position-in-sub-scanning-direction detecting unit 51 generates correction data based on the measured misalignment distance. Misalignment of a pixel can be corrected by changing the proportions of the light emission time of light sources as described above based on the correction data.

Figure 12:
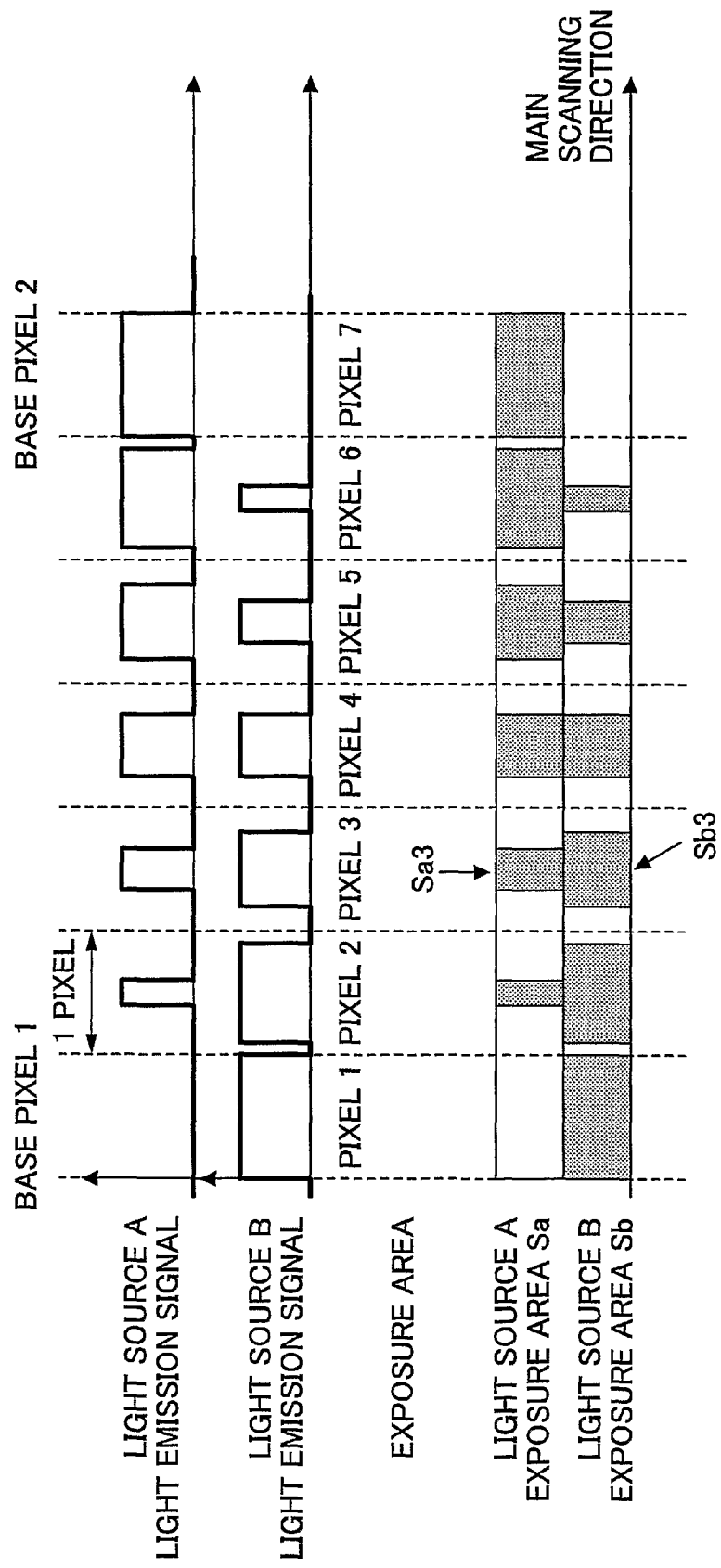
FIG. 12 is a drawing used to describe an exemplary method of controlling M light emitting sources to shift the centroid of a pixel in the sub scanning direction.

FIG. 12 is a drawing used to describe an exemplary method of controlling M light emitting sources to shift the centroid of a pixel in the sub scanning direction, where the proportions of the light emission time of the M light emitting sources are changed while not changing the total exposure area exposed by the M light emitting sources. In FIG. 12, M light emitting sources are composed of light sources A and B. Light emission signals of the light sources A and B are shown in the upper part of the drawing. Exposure areas Sa and Sb on a photoconductor exposed by changing the proportions of the light emission signals of the light sources A and B are shown in the lower part of the drawing with the rightward direction being the main scanning direction.

In FIG. 12, a photoconductor in a light scanning apparatus is exposed according to the light emission signals from the light sources A and B and the proportions of light emission time of the light emission signals of the light sources A and B are changed. The exposure areas exposed by the light source A are called exposure areas Sa and the exposure areas exposed by the light source B are called exposure areas Sb. Take pixel 3 for example. When the exposure area exposed by the light source A is Sa3 and the exposure area exposed by the light source B is Sb3, the light emission signals of the light sources A and B are controlled so that Sall (total exposure area)=Sa3+Sb3=Sai+Sbi (i is a natural number) is true. In other words, the proportions of light emission time of light emission signals of the light sources A and B are changed while not changing the total exposure area. In this way, the centroid of an exposure area of a pixel can be shifted in the sub scanning direction by changing the proportions of light emission time of the light emission signals of the light sources A and B while not changing the total exposure area per pixel. Accordingly, misalignment of a pixel in the sub scanning direction can be corrected by changing the proportions of light emission time of light emission signals of light sources based on correction data in a similar manner as described by using FIG. 11.

Figure 13:
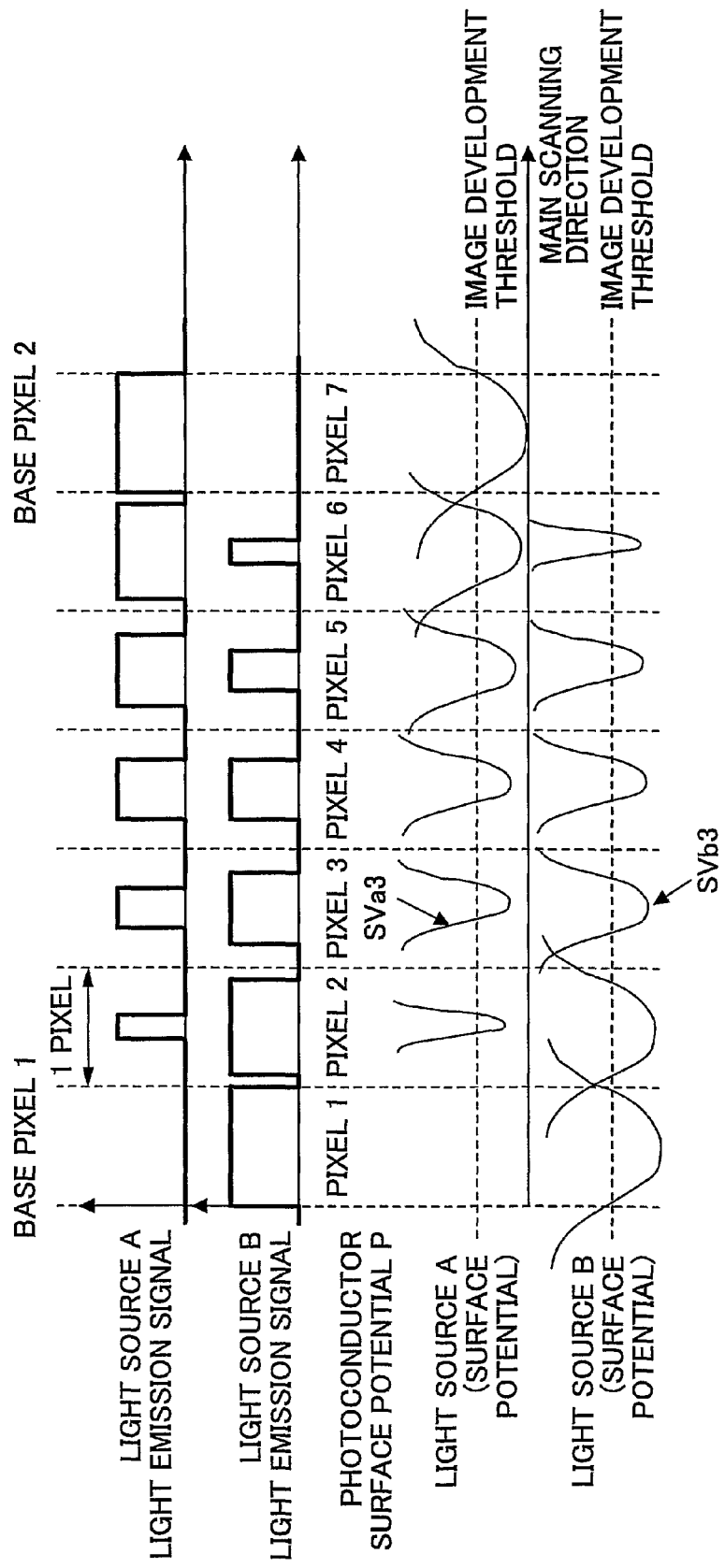
FIG. 13 is a drawing used to describe an exemplary method of controlling M light emitting sources to shift the centroid of a pixel in the sub scanning direction.

FIG. 13 is a drawing showing surface potentials formed on a photoconductor by changing light emission signals of two light sources. In FIG. 13, M light emitting sources are composed of light sources A and B, a photoconductor is exposed according to the light emission signals from the light sources A and B, and the proportions of light emission time of the light emission signals of the light sources A and B are changed. When the amount of light exceeds an image development threshold, a surface potential sufficient to form a pixel on the photoconductor is obtained. The amount of light is determined by light emission time and a light emission level. Image development areas where the amount of light is above the image development threshold are called SVa and SVb. SVa corresponds to the light source A and SVb corresponds to the light source B. Take pixel 3 for example. When the image development area corresponding to the light source A is SVa3 and the image development area corresponding to the light source B is SVb3, the light emission signals of the light sources A and B are controlled so that SVall (total image development area)=SVa3+SVb3=SVai+SVbi (i is a natural number) is true. In other words, the proportions of light emission time of light emission signals of the light sources A and B are changed while not changing the total image development area. In this way, the centroid of an image development area of a pixel can be shifted in the sub scanning direction by changing the light emission signals of the light sources A and B (in this example, the proportions of light emission time are changed; substantially the same result may be obtained by changing the proportions of light emission levels) while not changing the total image development area per pixel. Accordingly, misalignment of a pixel in the sub scanning direction can be corrected by changing the proportions of light emission time of light emission signals of light sources based on correction data in a similar manner as described by using FIG. 11.

Figure 14:
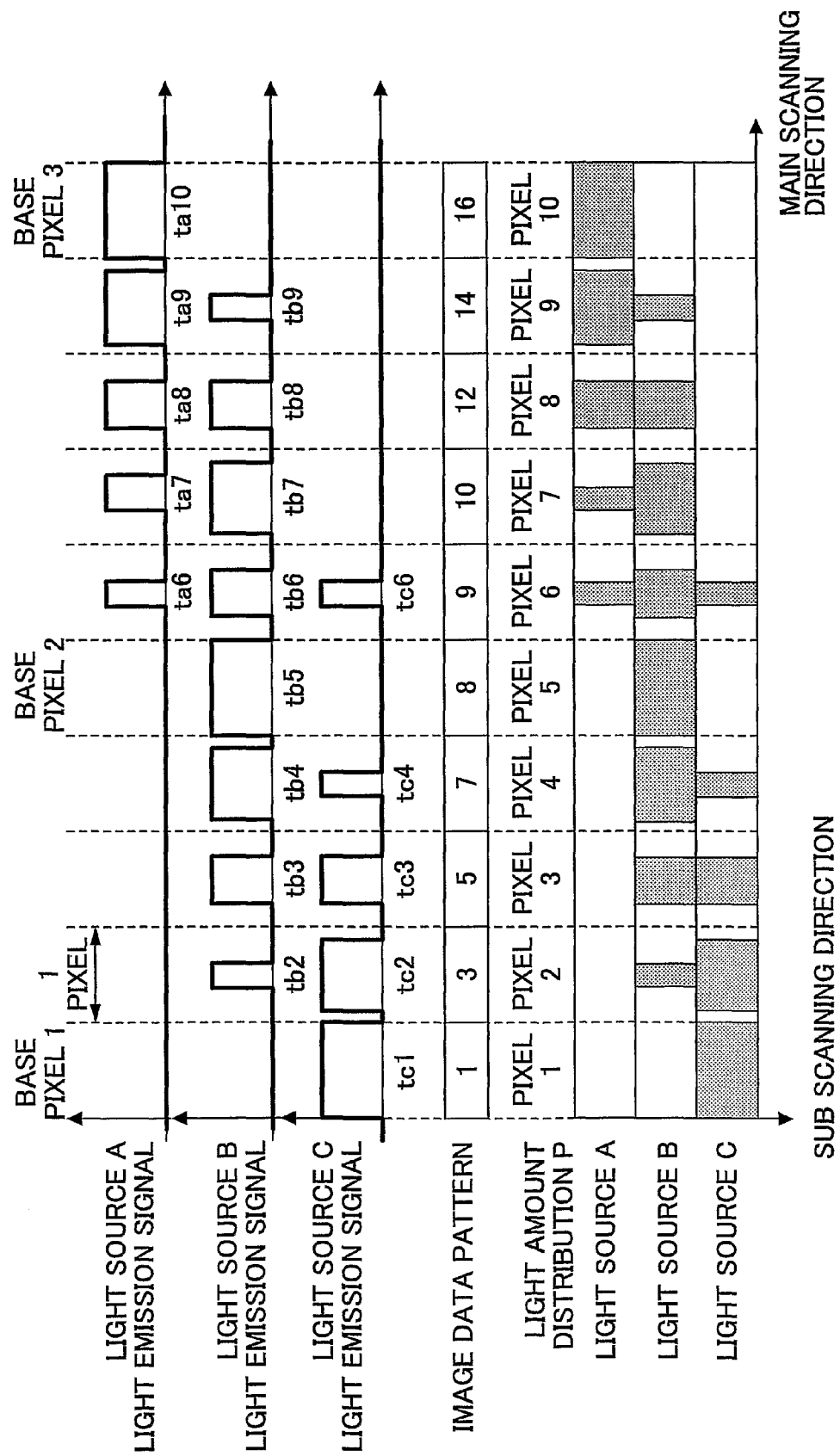
FIG. 14 is a drawing used to describe an exemplary method of controlling M light emitting sources to shift the centroid of a pixel in the sub scanning direction.

FIG. 14 is a drawing used to describe an exemplary method of controlling M light emitting sources to shift the centroid of a pixel in the sub scanning direction, where three light sources are used. In FIGS. 11 and 12, the proportions of light emission time of the light emission signals of two light sources are changed while not changing the total light emission time or the total exposure area to correct misalignment of a pixel in the sub scanning direction. However, in FIG. 14, M light emitting sources are composed of light sources A, B, and C. When pixel 6 shown in FIG. 14 is misaligned in the sub scanning direction, the centroid of pixel 6 can be shifted in the sub scanning direction by controlling the light emission signals of the light sources A, B, and C as exemplified by the other pixels shown in FIG. 14. Accordingly, misalignment of a pixel in the sub scanning direction can be corrected by changing the proportions of light emission time of light emission signals of light sources based on correction data in a similar manner as described by using FIG. 11.

Figure 15:
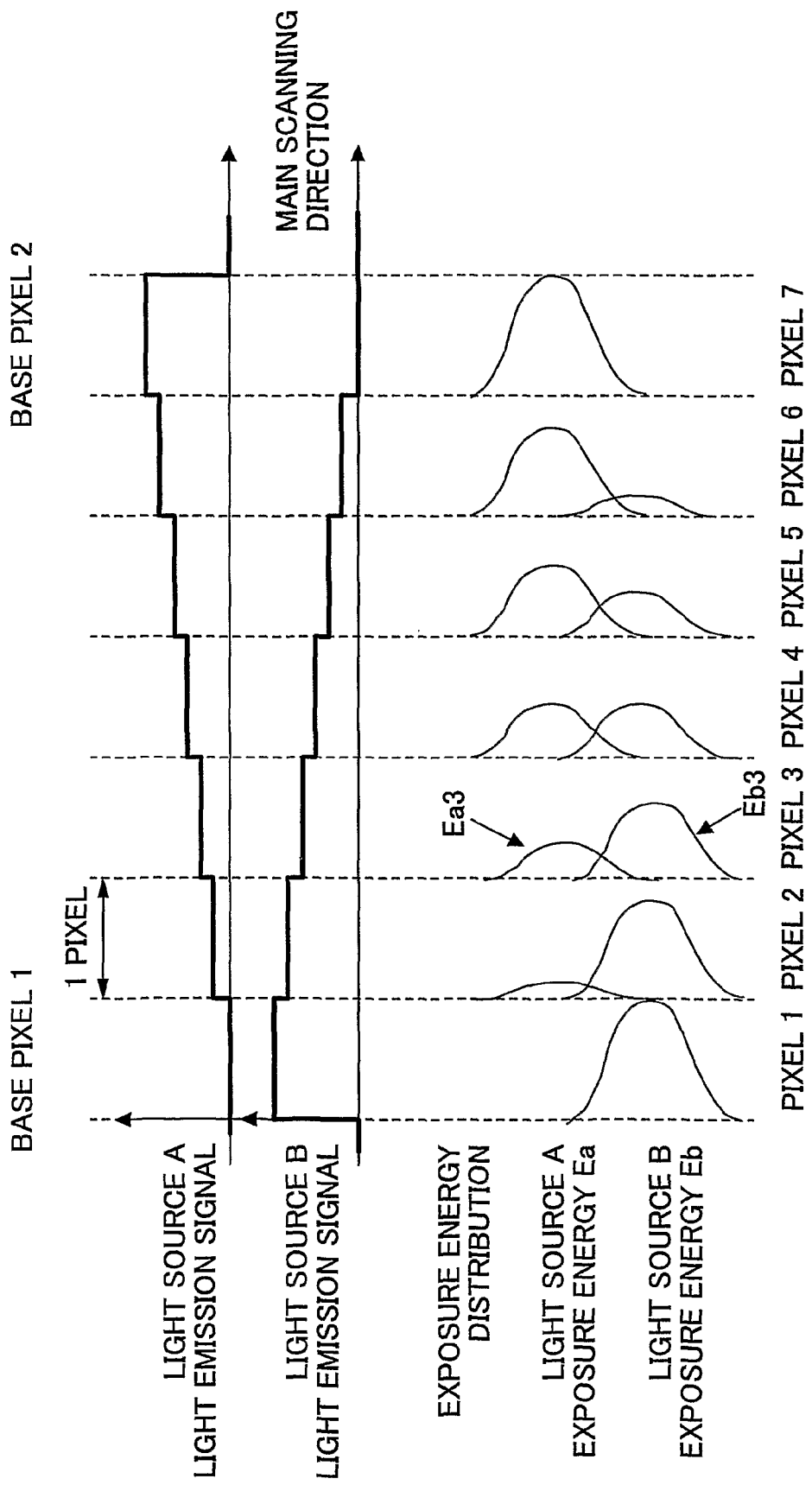
FIG. 15 is a drawing used to describe an exemplary method of controlling M light emitting sources to shift the centroid of a pixel in the sub scanning direction.

FIG. 15 is a drawing showing distribution of exposure energy of light beams scanned onto a photoconductor obtained by changing light emission levels of light emission signals of two light sources. In other words, FIG. 15 is a drawing used to describe an exemplary method of controlling M light emitting sources to shift the centroid of a pixel in the sub scanning direction, where the proportions of light emission levels of the M light emitting sources are changed to change the proportions of exposure energy of the M light emitting sources while not changing the total exposure energy of the M light emitting sources.

In the exemplary method shown in FIG. 15, the proportions of exposure energy are changed by changing the proportions of light emission levels. Take pixel 3 for example. When the exposure energy of the light source A is Ea3 and the exposure energy of the light source B is Eb3, the proportions of the light emission levels of the light sources A and B are changed so that Eall (total exposure energy)=Ea3+Eb3=Eai+Ebi (i is a natural number) is true. In other words, the proportions of the light emission levels of the light sources A and B are changed while not changing the total exposure energy. In this way, the centroid of exposure energy of a pixel can be shifted in the sub scanning direction by changing the proportions of light emission levels of the light sources A and B while not changing the total exposure energy per pixel. Accordingly, misalignment of pixels in the sub scanning direction can be corrected by changing the proportions of light emission levels of light sources based on correction data in a similar manner as described by using FIG. 11.

Figure 16:
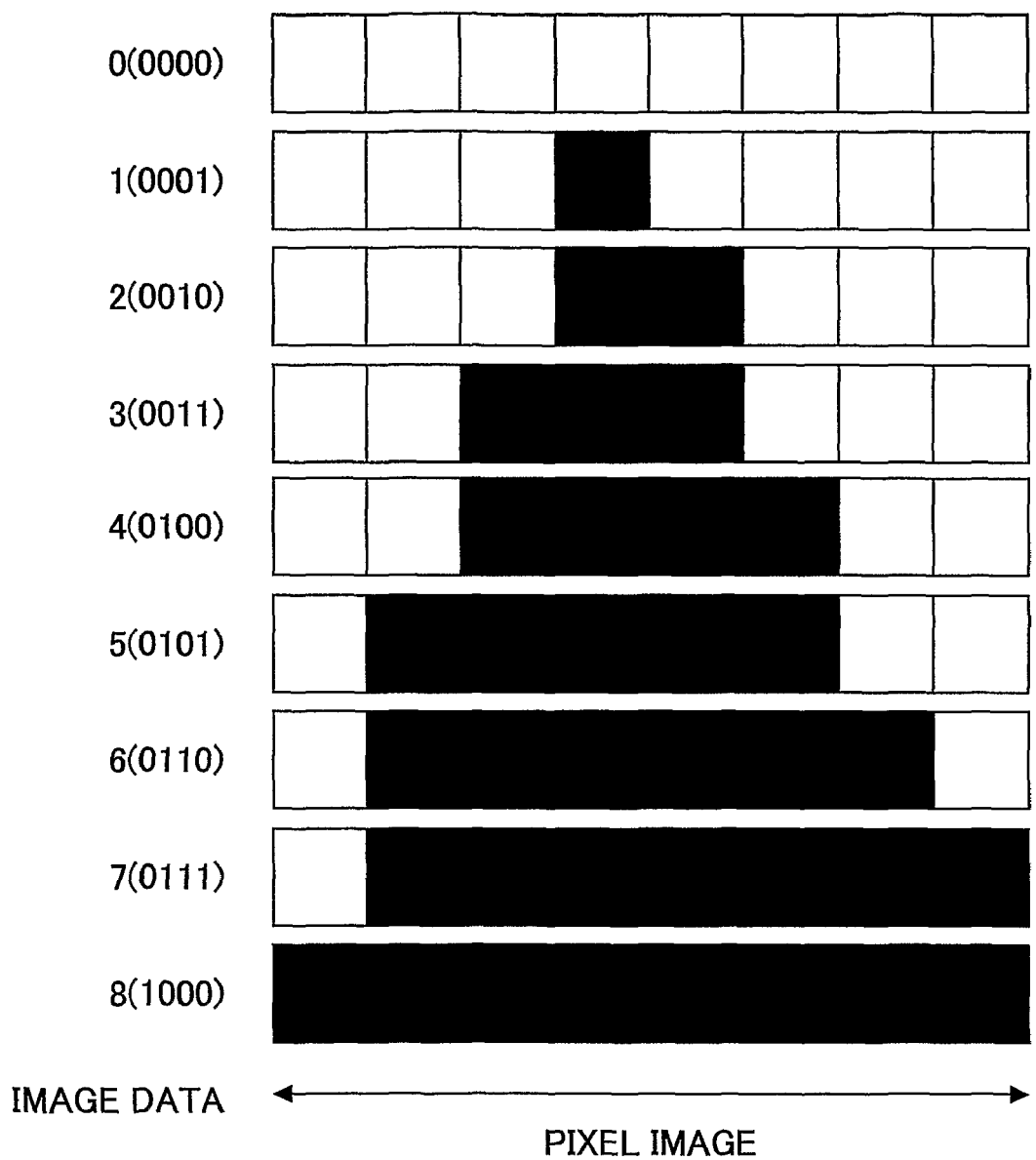
FIG. 16 is a drawing used to describe an exemplary process by a light source control unit of changing light emission time of light sources.

FIG. 16 is a drawing and FIG. 17 is a table that are used to describe an exemplary process (by the light source control unit 50) of changing light emission time of light sources A and B as shown, for example, in FIG. 11. FIG. 16 shows image data and pixel images representing exemplary pulses generated by the light source control unit 50. In this example, eight pulses constitute one pixel (for example, any one of pixels 1 through 7 shown in FIG. 11). In FIG. 16, pulses are formed from the center of each pixel. Each pixel image shows the width of a pixel. Image data 1 shows a pixel with an ⅛ width, image data 2 shows a pixel with a ⅖ width, image data 3 shows a pixel with a ⅜ width, and so on. FIG. 17 shows patterns of controlling light emission time of light sources A and B based on the relationship between image data and pixel images as shown in FIG. 16. Rows in the table in FIG. 17 show seven patterns of controlling light emission time of the light sources A and B. Figures in the columns of the light sources A and B correspond to the numbers assigned to image data shown in FIG. 16.

The light source control unit 50 selects one of the seven patterns shown in FIG. 17 according to correction data. The light source control unit 50 selects pattern 1 when correction data (000) is given; pattern 2 when correction data (001) is given; pattern 3 when correction data (010) is given; pattern 4 when correction data (011) is given; pattern 5 when correction data (100) is given; pattern 6 when correction data (101) is given; and pattern 7 when correction data (111) is given. For example, the light source control unit 50 controls the light sources A and B as shown in FIG. 11 when correction data (000), (001), (010), (011), (100), (101), and (111) are given sequentially.

Accordingly, misalignment of a pixel in the sub scanning direction can be corrected by shifting the centroid of the pixel in the sub scanning direction by selecting one of the seven patterns shown in FIG. 17 according to correction data in a similar manner as described by using FIG. 11.

Figure 18:
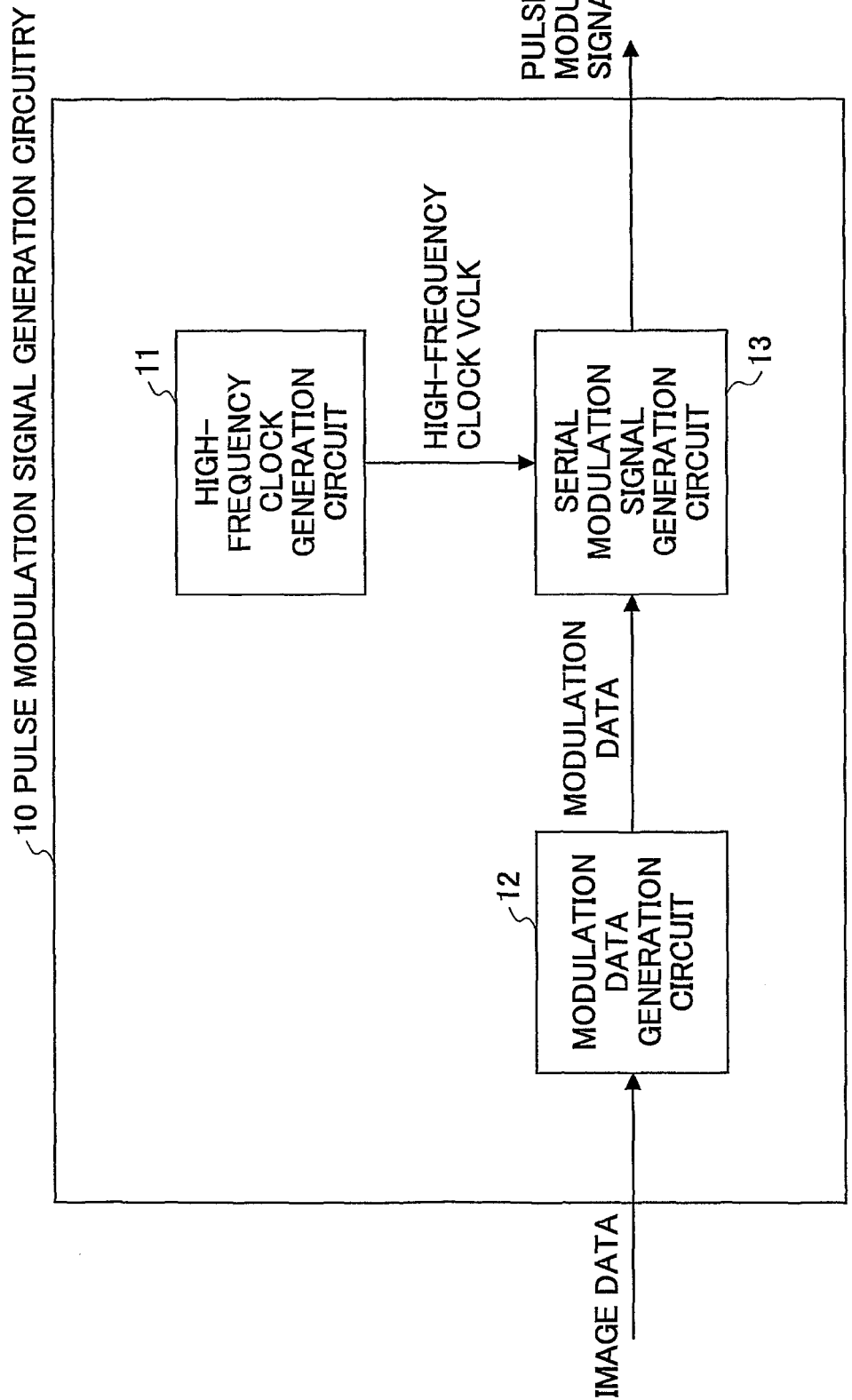
FIG. 18 is a block diagram illustrating an exemplary configuration of pulse modulation signal generation circuitry.

Image data as shown in FIG. 16 can be generated by pulse modulation signal generation circuitry 10 shown in FIG. 18 as a pulse width modulation signal PWM. The pulse modulation signal generation circuitry 10 shown in FIG. 18 includes a high-frequency clock generation circuit 11, modulation data generation circuit 12, and a serial modulation signal generation circuit 13. The high-frequency clock generation circuit 11 generates a high-frequency clock VCLK having a frequency far higher than that of a pixel clock which is a basic clock used to form a pixel in a conventional image forming apparatus. The modulation data generation circuit 12 generates modulation data representing a bit pattern based on image data input from an external device (not shown) such as an image processing unit. The serial modulation signal generation circuit 13 receives modulation data output from the modulation data generation circuit 12, converts the modulation data into a serial pulse pattern string (pulse string) based on the high-frequency clock VCLK, and outputs the pulse pattern string as a pulse modulation signal PWM. When modulation data are directly input from an external device into the serial modulation signal generation circuit 13, the modulation data generation circuit 12 can be omitted.

The pulse modulation signal generation circuitry 10 inputs modulation data into the serial modulation signal generation circuit 13, serially outputs a pulse string corresponding to a bit pattern of the modulation data based on a high-frequency clock having a frequency far higher than that of a pixel clock, and thereby generates a pulse modulation signal PWM. This mechanism is the main feature of the pulse modulation signal generation circuitry 10. A shift register may be used for the serial modulation signal generation circuit 13.

Figure 19:
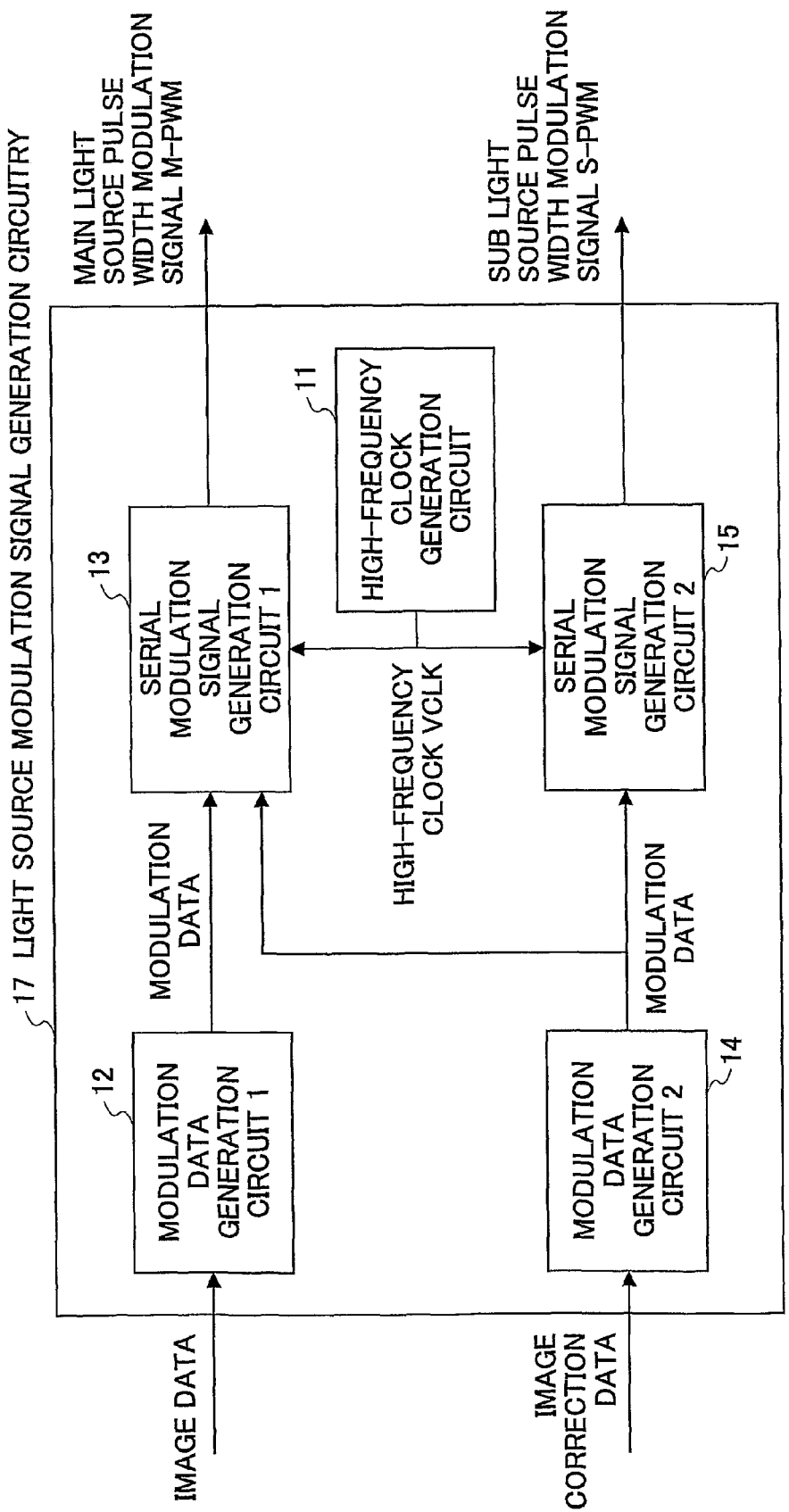
FIG. 19 is a block diagram illustrating an exemplary configuration of light source modulation signal generation circuitry based on the pulse modulation signal generation circuitry shown in FIG. 18.

Light source modulation signal generation circuitry 17 shown in FIG. 19 is based on the concept of the pulse modulation signal generation circuitry 10 shown in FIG. 18. The light source modulation signal generation circuitry 17 can be used to generate image data as shown in FIG. 16 as a pulse width modulation signal PWM and to control light sources according to a pattern as shown in FIG. 17.

The light source modulation signal generation circuitry 17 shown in FIG. 19 is configured to use image data and correction data to control light sources A and B. Image data in this case may be a scanned image of a copier or print data of a printer. Correction data in this case may contain information to correct the position of the centroid of a pixel of an image data in the sub scanning direction, which correction data are generated by the pixel-position-in-sub-scanning-direction detecting unit 51.

In the light source modulation signal generation circuitry 17, image data are converted by a modulation data generation circuit 1 (12) into modulation data and input into a serial modulation signal generation circuit 1 (13). Similarly, correction data are converted by a modulation data generation circuit 2 (14) into modulation data and input into the serial modulation signal generation circuit 1 (13) and a serial modulation signal generation circuit 2 (15). The serial modulation signal generation circuits 1 and 2 (13 and 15) output pulse width modulation signals (a main light source pulse width modulation signal M-PWM and a sub light source pulse width modulation signal S-PWM) based on the modulation data from the modulation data generation circuits 1 and 2 (12 and 14) and the high-frequency clock output from the high-frequency clock generation circuit 11. When 4-bit image data as shown in FIG. 16 are input, the light source modulation signal generation circuitry 17 outputs, based on the input 4-bit image data, pulse modulation signals for a corresponding pixel image as shown in FIG. 16. For example, the main light source pulse width modulation signal M-PWM can be used as a control signal to control the light source B shown in FIG. 11 and the sub light source pulse width modulation signal S-PWM can be used as a control signal to control the light source A shown in FIG. 11.

In the above case, one of the seven patterns shown in FIG. 17 is selected according to the correction data. When the pulse width of image data 8 (1000) represents the standard light emission time, the total pulse width (duration) of the light sources A and B in each pattern shown in FIG. 17 is always eight. As described above, misalignment in the sub scanning direction of a pixel formed with two light sources can be corrected by selecting one of the seven patterns in a lookup table (LUT) as shown in FIG. 17 according to correction data. For example, when correction data is (000), the light source modulation signal generation circuitry 17 selects pattern 1 in FIG. 17 and controls the light sources A and B based on the image data 0 and 8 in FIG. 16. When correction data is (010), the light source modulation signal generation circuitry 17 selects pattern 3 in FIG. 17 and controls the light sources A and B based on the image data 3 and 5 in FIG. 16.

As described above, the pulse modulation signal generation circuitry 10 shown in FIG. 18 (or more precisely the light source modulation signal generation circuitry 17 shown in FIG. 19) can be used as the light source control unit 50 to control the light sources A and B as shown in FIG. 11.

Figure 20:
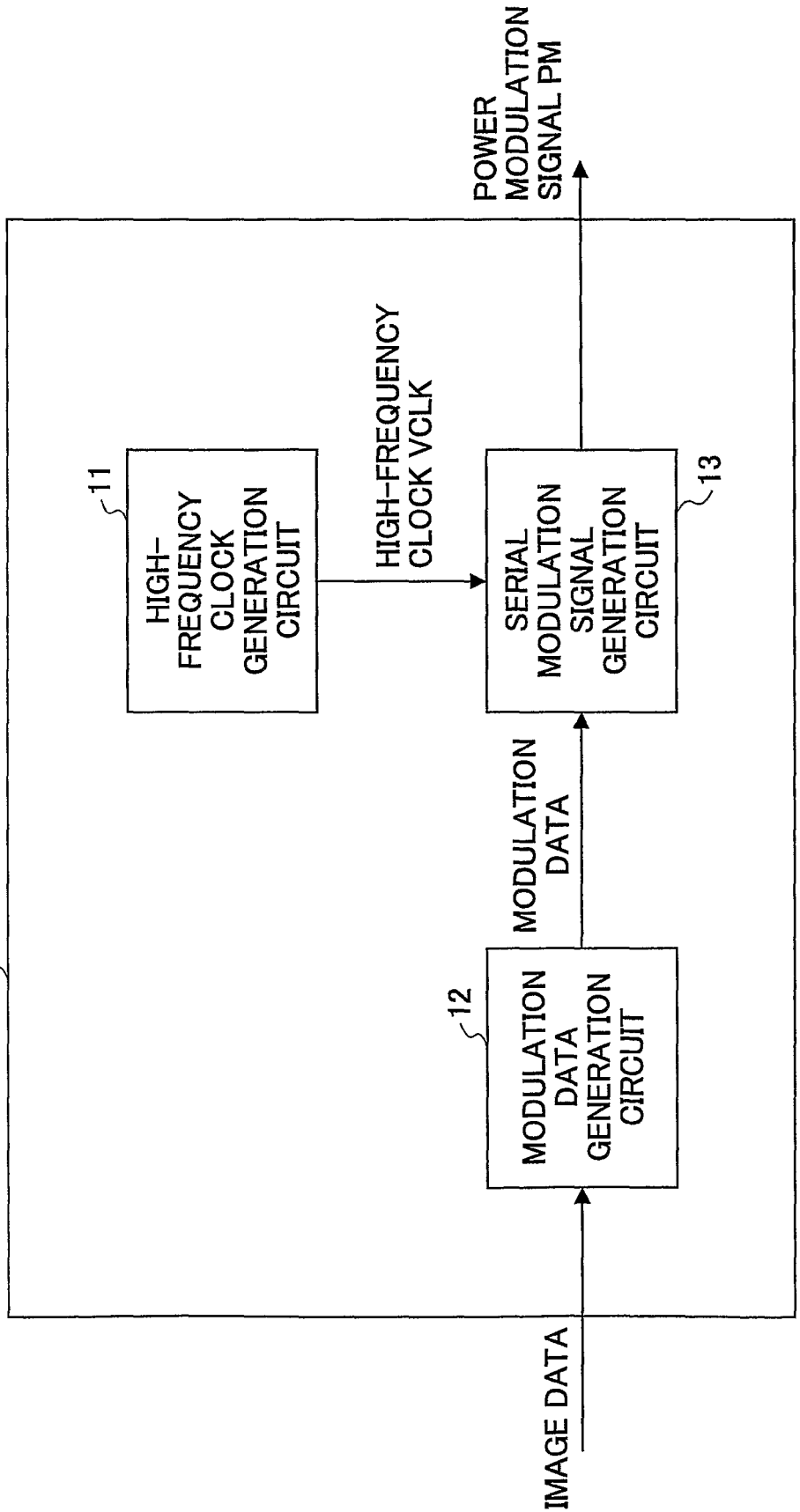
FIG. 20 is a block diagram illustrating an exemplary configuration of power modulation signal generation circuitry.

An exemplary configuration of circuitry used to control light sources as shown in FIG. 11 is described above. When controlling light sources as shown in FIG. 15, power modulation signal generation circuitry 18 as shown in FIG. 20 can be used instead of the pulse modulation signal generation circuitry 10 shown in FIG. 18. In the power modulation signal generation circuitry 18 shown in FIG. 20, image data input into a modulation data generation circuit 12 represent the amount of light emitted from each light source. The modulation data generation circuit 12 modulates the intensity of the signal of the image data. A serial modulation signal generation circuit 13 serially outputs a power signal corresponding to the light intensity of the modulated signal based on a high-frequency clock generated by a high-frequency clock generation circuit 11 which high-frequency clock having a frequency far higher than that of a pixel clock, and thereby generates a power modulation signal PM.

Light source control as shown in FIG. 15 can be performed with circuitry similar to that shown in FIG. 19 and composed of two sets of circuitry as shown in FIG. 20.

Also, the light source control unit 50 in a light scanning apparatus according to an embodiment of the present invention may be configured to perform pulse width modulation and power modulation at the same time and thereby to change stepwise the proportions of light emission time and light emission levels of M ((N−1)≧M≧2) light sources to shift the centroid of a pixel in the sub scanning direction.

A light source control unit 50 for controlling three or more light sources (for example, as shown in FIG. 14) can also be easily implemented by expanding the configuration of the circuitry shown in FIG. 19.

According to the present invention, methods of controlling light sources are not limited to the above disclosed methods, but various other methods may also be used.

For example, as shown in FIG. 8, the light source control unit 50 may include a function to select M light emitting sources to be caused to emit light out of the N light sources individually for each pixel. Such a mechanism makes it possible to correct the position of each pixel with an accuracy higher than the size of the pixel.

Figure 21:
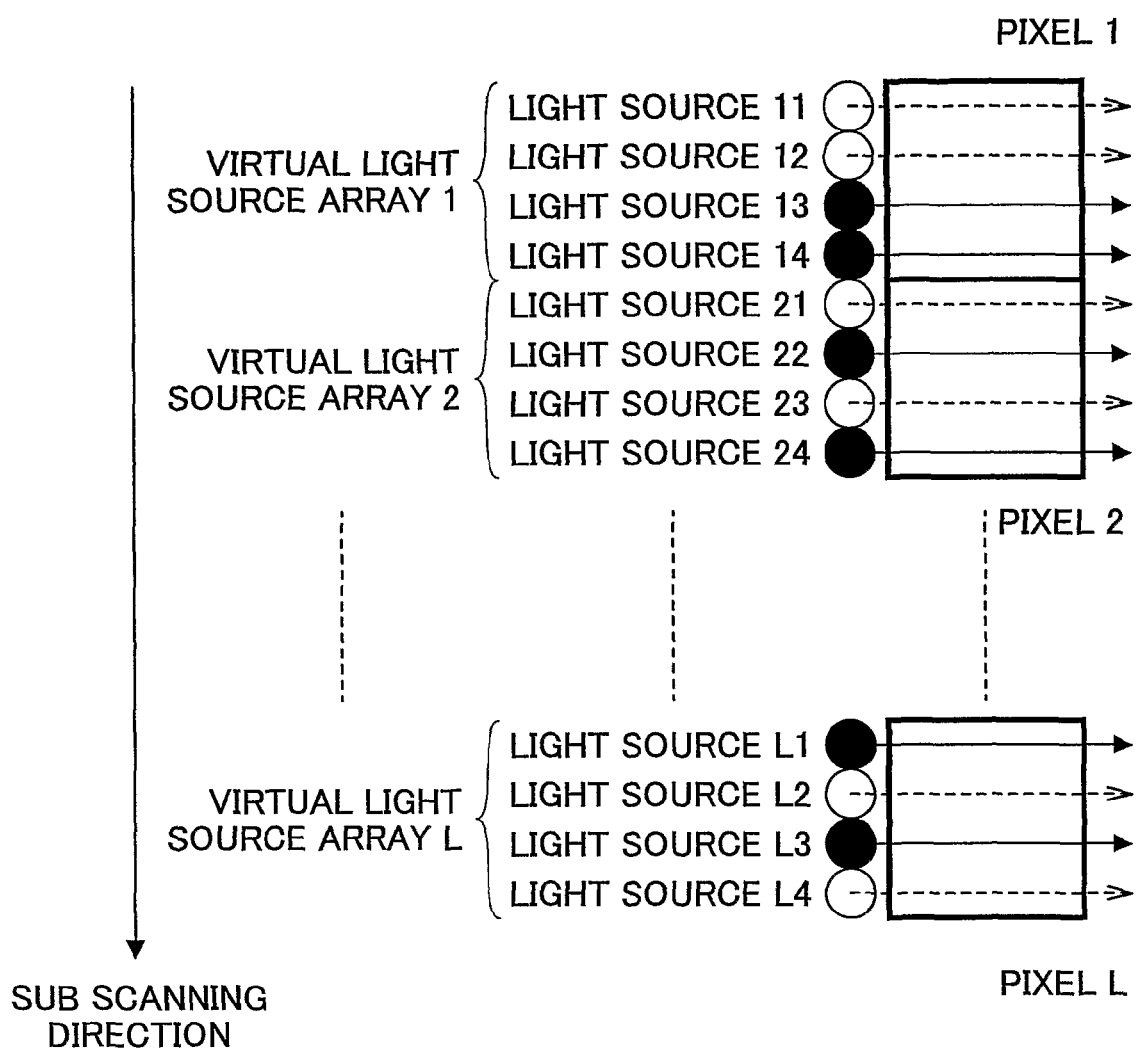
FIG. 21 is a drawing used to describe an exemplary method of controlling light sources.

As described above with reference to FIG. 3, it is generally preferable to cause light sources (for example, two light sources out of four light sources) the scanning positions of which are adjacent to each other in the sub scanning direction to emit light. However, it is also possible to control light sources, for example, as shown in FIG. 21.

Figure 22:
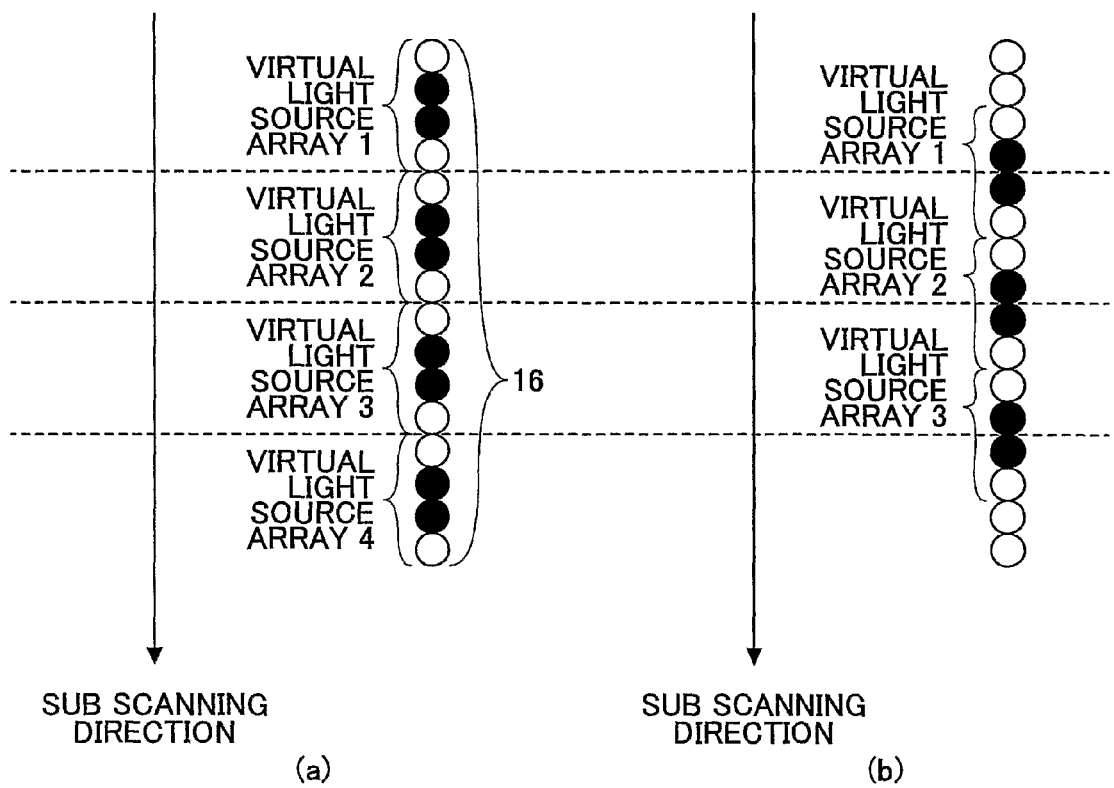
FIG. 22 is a drawing used to describe a function to change the configurations of virtual light source arrays.

Also, the light source control unit 50 in a light scanning apparatus according to an embodiment of the present invention may be configured to include a function to change the configurations of virtual light source arrays. FIG. 22 is a drawing used to describe a function to change the configurations of virtual light source arrays. In the example shown in FIG. 22, a virtual light source array is composed of four light sources and two of them are caused to emit light. In FIG. 22 (*a*), four pixels are formed by four virtual light source arrays. In FIG. 22 (*b*), three virtual light source arrays are formed by combining light sources in a different way from that shown in FIG. 22 (*a*). In this case, pixels are formed at positions crossing the lines dividing the virtual light source arrays in FIG. 22 (*a*). Changing the number of virtual light source arrays or the combinations of light sources in virtual light source arrays as described above makes it possible to more precisely set the positions of pixels.

One disadvantage of the exemplary method shown in FIG. 22 is that when the configurations of virtual light source arrays are changed from FIG. 22 (*a*) to (*b*), the number of pixels to be formed is decreased from four to three To avoid this disadvantage, it is preferable to provide extra light sources in addition to N×L (number of virtual light source arrays) light sources.

When N×L light sources are provided to form L virtual light source arrays in the sub scanning direction, it is preferable to add at least N−1 extra light sources to provide N−1 extra virtual light sources aligned in the sub scanning direction at either end of an array of N×L virtual light sources formed in the sub scanning direction by the N×L light sources.

Figure 23:
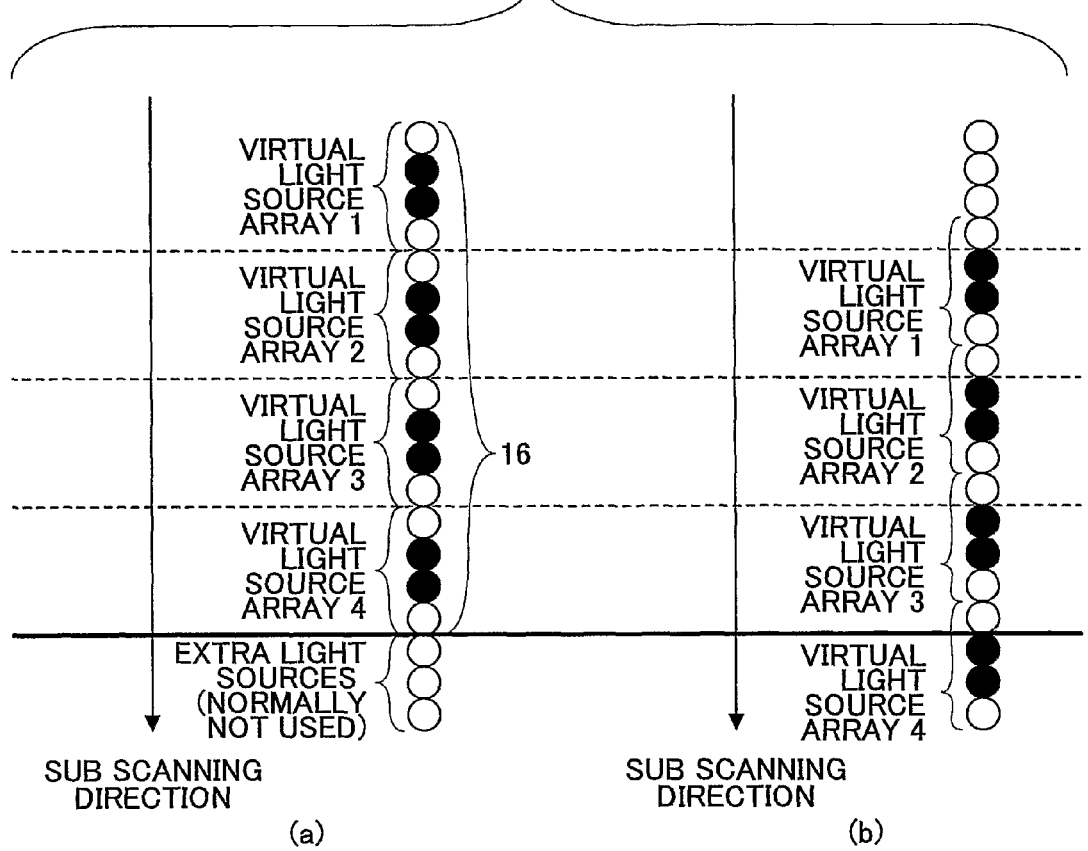
FIG. 23 is a drawing illustrating an exemplary light source unit where extra light sources are provided.
Figure 24:
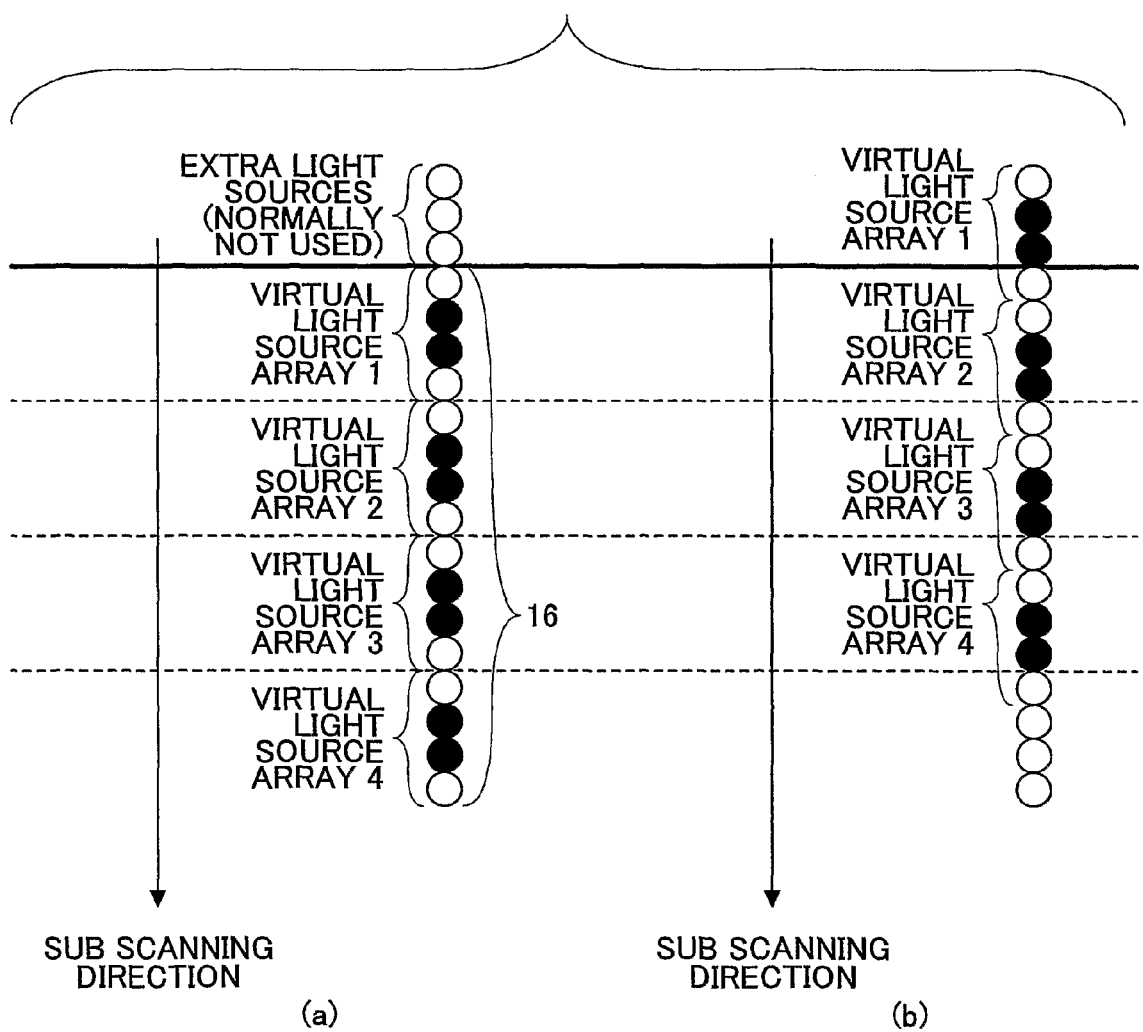
FIG. 24 is a drawing illustrating an exemplary light source unit where extra light sources are provided.

In FIG. 23, N−1=3 extra light sources are added to provide 3 extra virtual light sources below N (4)×L(4)=16 virtual light sources. In FIG. 24, 3 extra light sources are added to provide 3 extra virtual light sources above 16 virtual light sources. With the extra light sources, four pixels can be formed even when the configurations of virtual light source arrays are changed from FIG. 23 (*a*) to 23 (*b*) or from FIG. 24 (*a*) to 24 (*b*).

Also, when N×L light sources are provided to form L virtual light source arrays in the sub scanning direction, 2×(N−1) extra light sources may be added to provide N−1 extra virtual light sources aligned in the sub scanning direction at both ends of an array of N×L virtual light sources formed in the sub scanning direction by the N×L light sources.

Figure 25:
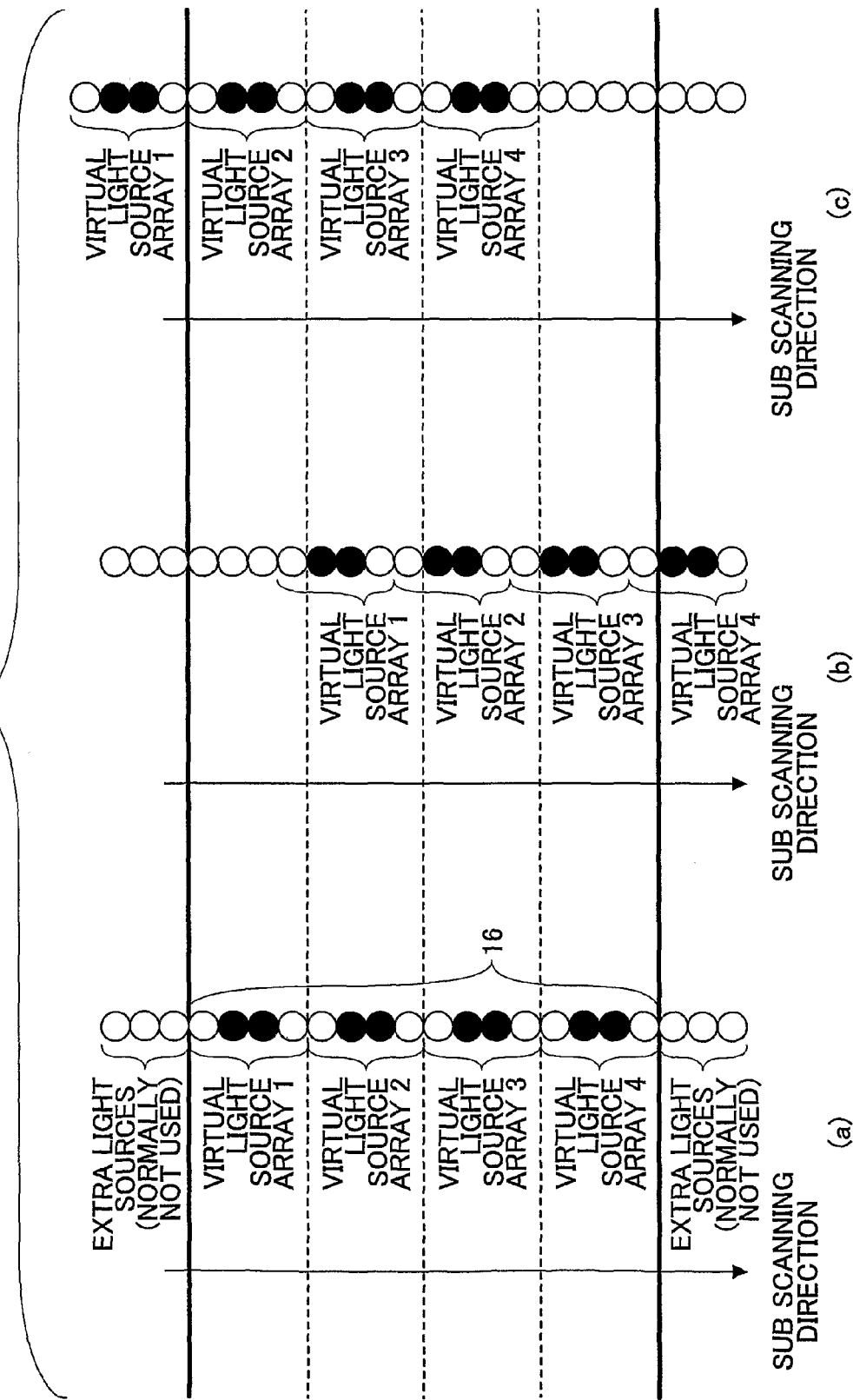
FIG. 25 is a drawing illustrating an exemplary light source unit where extra light sources are provided.

In FIG. 25, 2×(N−1)=6 extra light sources are added to provide N−1=3 extra virtual light sources above and below N(4)×L(4)=16 virtual light sources. With the extra light sources, four pixels can be formed even when the configurations of virtual light source arrays are changed from FIG. 25 (*a*) to 25 (*b*) or from FIG. 25 (*a*) to 24 (*c*).

Figure 26:
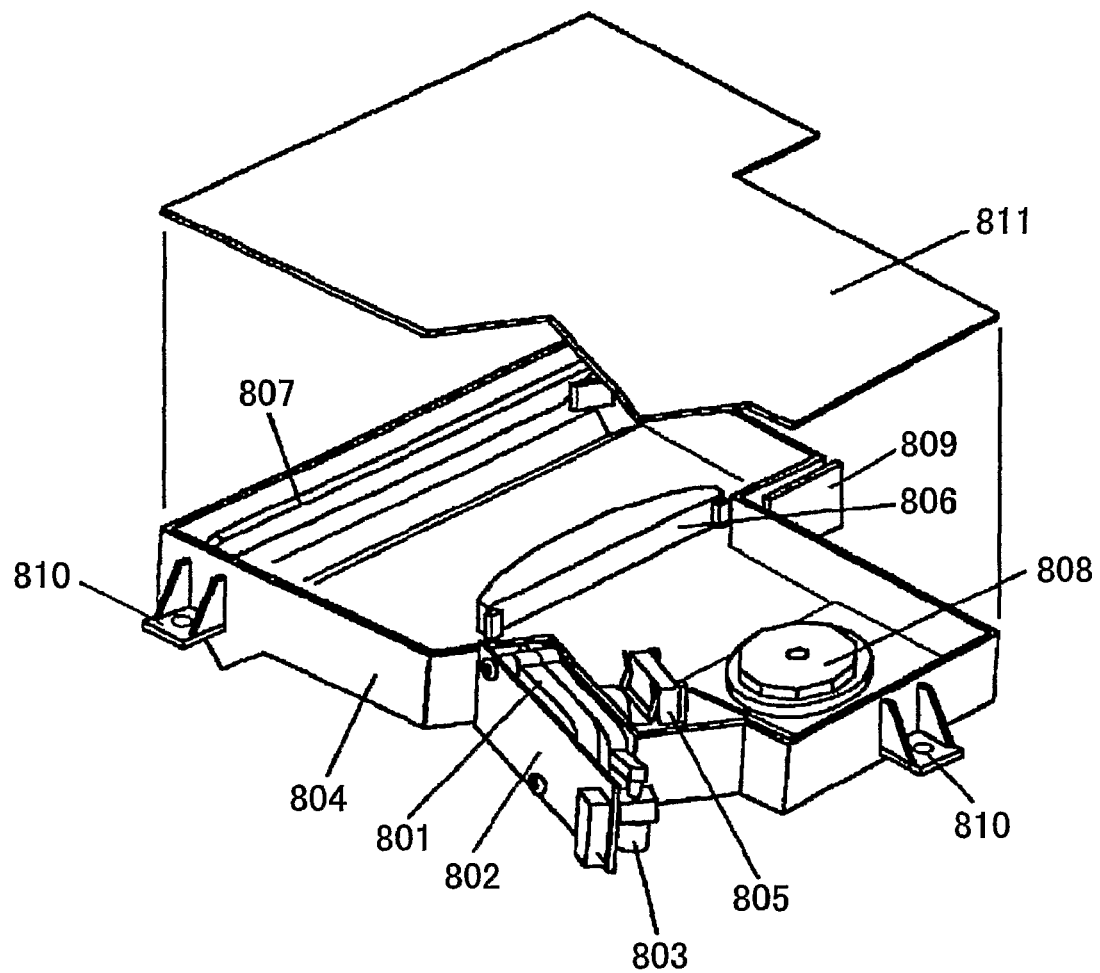
FIG. 26 is a drawing illustrating an exemplary image forming apparatus using a light scanning apparatus according to an embodiment of the present invention.

FIG. 26 is a drawing illustrating an exemplary image forming apparatus using a light scanning apparatus according to an embodiment of the present invention.

As shown in FIG. 26, a printed circuit board 802 is attached to the back of a light source unit 801, on which printed circuit board 802 a control circuit for controlling a semiconductor laser and a pixel clock generation device are formed. The printed-circuit board 802 is brought into contact by a spring with the surface of an optical housing which surface intersects orthogonally with a light axis and is fixed by an adjusting screw 803 in a position to form an appropriate angle. The adjusting screw 803 is screwed into a protrusion formed on the surface of the optical housing. In the optical housing, a cylinder lens 805, a polygon motor 808 for rotating a polygon mirror, a fθ lens 806, a toroidal lens, and a turn-around mirror 807 are fixed in position. A printed-circuit board 809 is attached to an external surface of the optical housing in a similar manner as the light source unit 801. The upper side of the optical housing is covered by a cover 811. The optical housing is fixed to the frame of the image forming apparatus by joining attaching parts 810 protruding from the surface of the optical housing to the frame with screws.

In the image forming apparatus, a semiconductor laser array or a surface emitting laser array having plural light sources as shown in FIG. 2 may be used as a semiconductor laser unit. Laser beams emitted from the semiconductor laser unit (surface emitting laser array) pass through the cylinder lens 805, deflected by the polygon mirror as it rotates, and scanned onto a photoconductor drum (not shown) via the fθ lens 806, the toroidal lens, and the turn-around mirror 807. Laser beams not scanned onto the photoconductor drum or some of laser beams reflected by the mirrors are detected by sensors. For example, a synchronization detecting sensor detects the time interval between two points in the main scanning direction corresponding to the rotation direction of the polygon mirror; and a position detection sensor detects a misalignment distance in the sub scanning direction that is orthogonal to the main scanning direction. The detected values are fed back to an LD control unit, a modulation circuit, or a modulation data generation unit to correct the position of a pixel.

A multibeam scanning apparatus (multibeam optical system) using plural light sources is described below.

Figure 27:
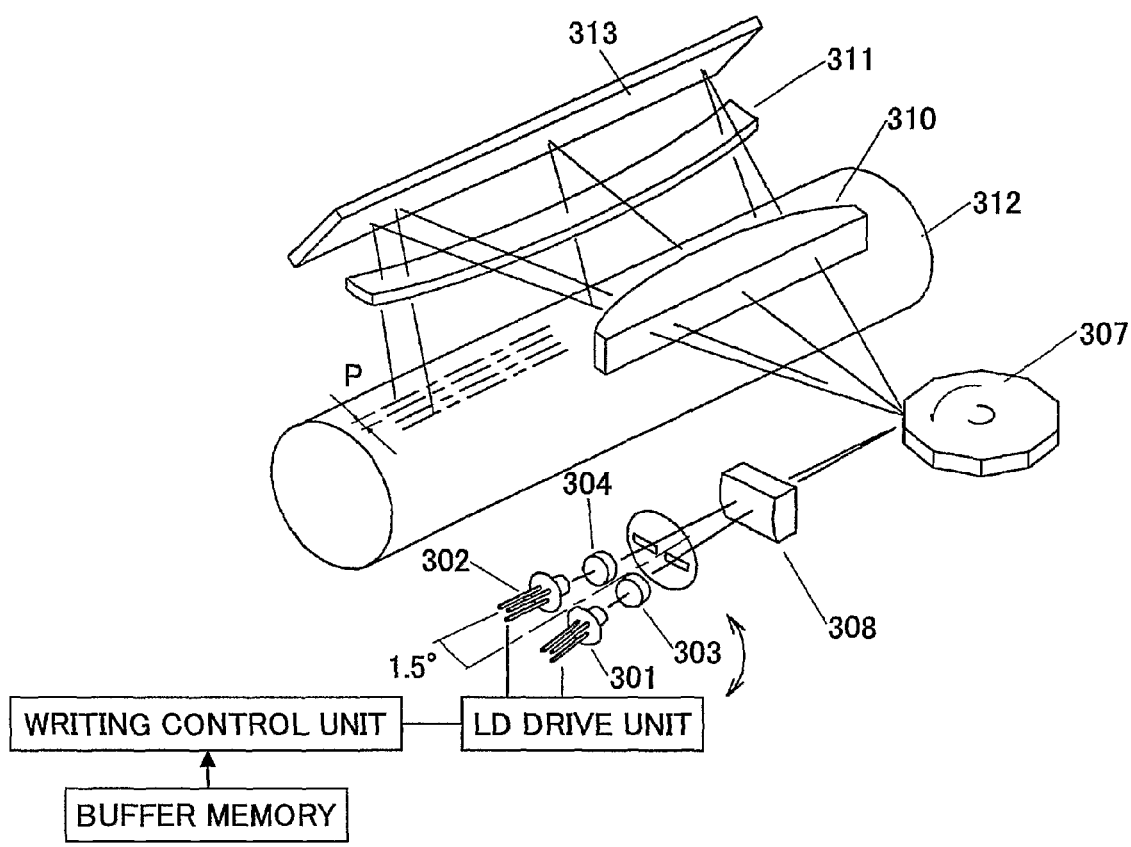
FIG. 27 is a drawing illustrating an exemplary multibeam scanning apparatus.

FIG. 27 is a drawing illustrating an exemplary multibeam scanning apparatus. In the exemplary multibeam scanning apparatus shown in FIG. 27, two semiconductor laser arrays 301 and 302 each having two light-emitting elements (four channels) monolithically arranged at an interval of ds=25 μm are used (eight light sources in total).

The semiconductor laser arrays 301 and 302 are positioned so that their light axes conform to the light axes of collimate lenses 303 and 304, their light-emission angles become symmetrical in the main scanning direction, and their light-emission axes intersect with each other at a reflecting point on a polygon mirror 307. Plural laser beams emitted from the semiconductor laser arrays 301 and 302 pass through the cylinder lens 308, are deflected and scanned by the polygon mirror 307, pass through a fθ lens 310 and a toroidal lens 311, and form an image on a photoconductor 312. One line of print data is stored in a buffer memory for each light-emitting element. Four lines of print data are retrieved for each side of the polygon mirror 307 from the buffer memory and are recorded at a time on the photoconductor 312.

According to an embodiment of the present invention, the differences in optical scan length or magnification of laser beams caused by wavelength differences of LDs providing the laser beams are corrected by shifting the phases of pixel clocks. This mechanism makes it possible to correct the differences in optical scan length with an accuracy of up to the phase shift level, thereby reducing the variations of scanned laser beams.

Figure 28:
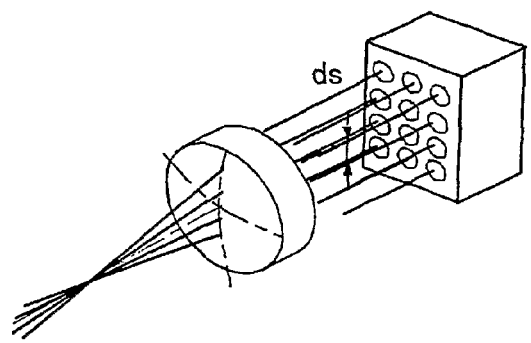
FIG. 28 is a drawing illustrating an exemplary light source unit implemented with a two-dimensional surface emitting laser array.

FIG. 28 is a drawing illustrating an exemplary light source unit of a light scanning apparatus which light source unit is implemented with a two-dimensional surface emitting laser array having a two-dimensional array of plural surface emitting lasers. In the two-dimensional surface emitting laser array shown in FIG. 28, 3 (horizontal)×4 (longitudinal)=12 light-emitting elements (surface emitting lasers) are arranged.

Figure 29:
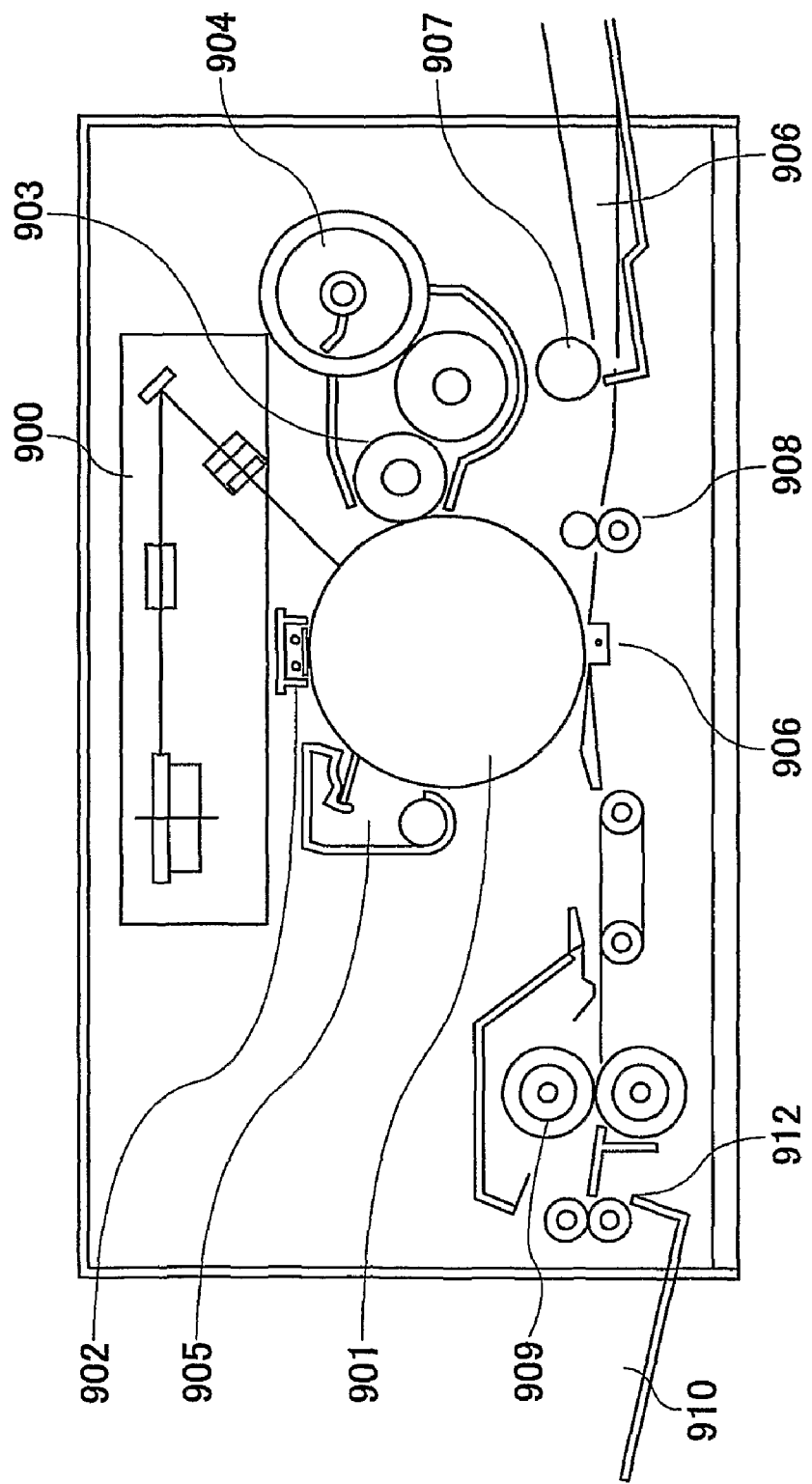
FIG. 29 is a drawing illustrating an exemplary configuration of an image forming apparatus according to an embodiment of the present invention.

FIG. 29 is a drawing illustrating an exemplary configuration of an image forming apparatus according to an embodiment of the present invention. As shown in FIG. 29, around a photoconductor drum 901 to be scanned, a charger 902 for charging the photoconductor drum 901 with a high voltage, a development roller 903 for developing an image by transferring charged toner to an electrostatic latent image recorded by a light scanning apparatus 900, a toner cartridge 904 for supplying toner to the development roller 903, and a cleaning case 905 for scraping and catching remaining toner on the photoconductor drum 901 are arranged. As described earlier, plural lines of an image are statically recorded at a time on the photoconductor drum 901. A sheet of paper is fed from a paper feed tray 906 by a paper feed roller 907. A pair of resist rollers 908 feed the sheet of paper in accordance with the timing of recording in the sub scanning direction. A transfer charger 906 transfers toner onto the sheet of paper when the sheet of paper passes between the photoconductor drum 901 and the transfer charger 906. A fixing roller 909 fixes the transferred toner to the sheet of paper. Then, a paper ejection roller 912 ejects the sheet of paper into a catch tray 910. Using a light scanning apparatus according to an embodiment of the present invention as the light scanning apparatus 900 of the image forming apparatus described above makes it possible to precisely correct the positions of dots, thereby making it possible to provide a high-quality image.

Figure 30:
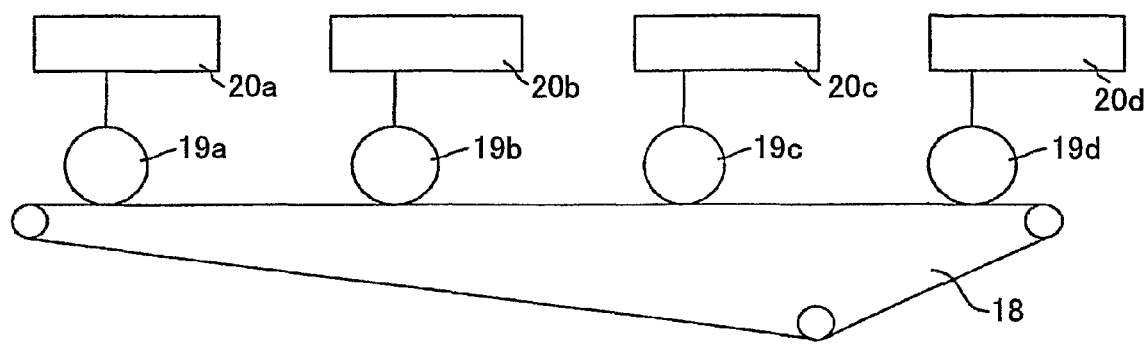
FIG. 30 is a drawing illustrating an exemplary color image forming apparatus.

The present invention can also be applied to a color image forming apparatus. FIG. 30 is a drawing illustrating an example of applying the present invention to a tandem color image forming apparatus having plural photoconductors. In a tandem color image forming apparatus, photoconductors corresponding to cyan, magenta, yellow, and black are normally provided. Such a tandem color image forming apparatus has light scanning systems each corresponding to a photoconductor, which light scanning systems form electrostatic latent images on the photoconductors through different light paths. Therefore, dot misalignment in the sub scanning direction on each photoconductor may have different characteristics.

In FIG. 30, 18 indicates a transfer belt; 19a, 19b, 19c, and 19d indicate photoconductors each corresponding to a different color; and 20a, 20b, 20c, and 20d indicate light scanning apparatuses each corresponding to a different color.

Using light scanning apparatuses according to an embodiment of the present invention as the light scanning apparatuses 20a, 20b, 20c, and 20d makes it possible to precisely correct the positions of dots in the sub scanning direction, thereby making it possible to provide a high-quality image. Embodiments of the present invention are especially effective in correcting the positions of dots in the sub scanning direction. Embodiments of the present invention effectively minimize a color shift between stations, thereby providing excellent color reproducibility.

Figure 31:
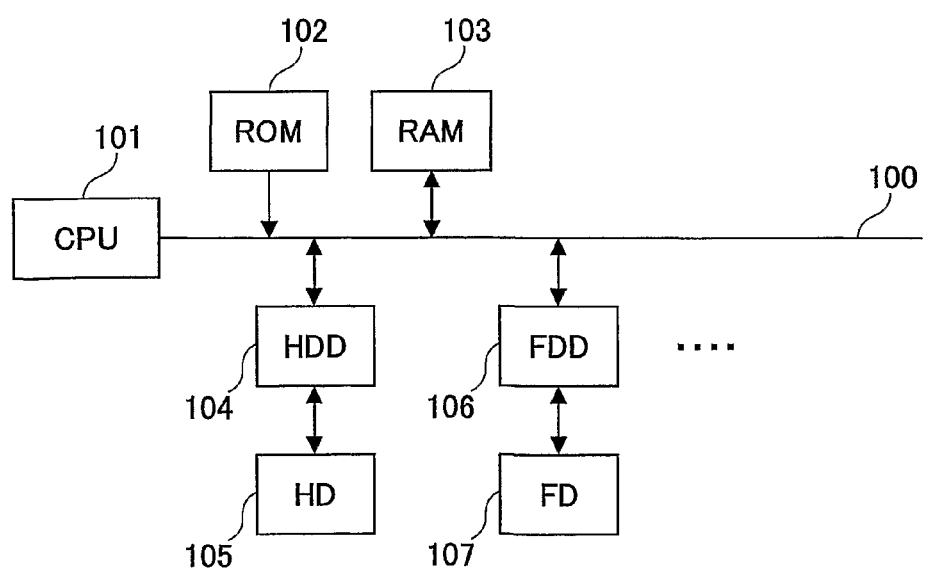
FIG. 31 is a block diagram illustrating an exemplary hardware configuration of a light source control unit of a light scanning apparatus according to an embodiment of the present invention.

FIG. 31 is a block diagram illustrating an exemplary hardware configuration of the light source control unit 50 of a light scanning apparatus according to an embodiment of the present invention. In this example, the light source control unit 50 includes a CPU 101, a ROM 102, a RAM 103, a hard disk drive (HDD) 104, a hard disk (HD) 105, a flexible disk drive (FDD) 106, a flexible disk (FD) 107, and a bus 100. The CPU 101, the ROM 102, the RAM 103, the HDD 104, and the FDD 106 are connected by the bus 100.

The CPU 101 controls the entire light scanning apparatus. The ROM 102 stores a control program. The RAM 103 is a work area for the CPU 101. The HDD 101 controls read and write operations from/to the HD 105 under the control of the CPU 101. The HD 105 stores data written by the HDD 104. The FDD 106 controls read and write operations from/to the FD 107 under the control of the CPU 101. The FD 107 is detachably inserted in the FDD 106 and stores data written by the FDD 106.

The functions of the light source control unit 50 according to embodiments of the present invention may be implemented by a program executed by a computer (for example, the CPU 101).

A program for causing a computer to perform the functions of the light source control unit 50 according to embodiments of the present invention may be stored in a computer-readable recording medium, such as a hard disk, floppy (registered trademark) disk, CD-ROM, MO, or DVD, and loaded and executed by a computer. Such a program may also be distributed via a network such as the Internet.

The present invention may be applied to image forming apparatuses such as a laser printer and a digital copier.

According to an embodiment of the present invention, a light scanning apparatus configured to scan plural light beams from plural light sources in a main scanning direction, where an array of N (N≧2) light beams aligned in a sub scanning direction is called a virtual light source array and each of the N light beams is called a virtual light source, includes a light source control unit configured to control the plural light sources to form L (L≧2) virtual light source arrays aligned in the sub scanning direction; and to cause M ((N−1)≧M≧1) light sources (M light emitting sources) out of N light sources corresponding to N virtual light sources in each of the L virtual light source arrays to emit light to form a pixel and thereby to form a total of L pixels aligned in the sub scanning direction.

According to an embodiment of the present invention, when (N−1)≧M≧2 is true, scanning positions of the M light emitting sources are adjacent to each other in the sub scanning direction.

The above embodiment makes it possible to correct the position of a pixel in the sub scanning direction with a high accuracy. According to an embodiment of the present invention, two or more light sources are used to form a pixel.

Therefore, it is possible to form a pixel even when the amount of light from each light source is small.

According to an embodiment of the present invention, the light source control unit is configured to control the M light emitting sources to shift the centroid of a pixel in the sub scanning direction.

According to an embodiment of the present invention, the light source control unit is configured to control the M light emitting sources to shift the centroid of a pixel a distance in the sub scanning direction according to correction data containing information to correct the position of the centroid of the pixel in the sub scanning direction.

According to an embodiment of the present invention, the light scanning apparatus further includes a pixel-position-in-sub-scanning-direction detecting unit configured to detect the position of a pixel in the sub scanning direction and to generate correction data containing information to correct the position of the centroid of the pixel in the sub scanning direction, wherein the light source control unit is configured to control the M light emitting sources to shift the centroid of the pixel a distance in the sub scanning direction according to the correction data generated by the pixel-position-in-sub-scanning-direction detecting unit.

According to an embodiment of the present invention, when $(N-1) \geq M \geq 2$ is true, the light source control unit is configured to change stepwise proportions of light emission time of the M light emitting sources by pulse width modulation while not changing total light emission time or a total exposure area of the M light emitting sources and thereby to shift the centroid of the pixel in the sub scanning direction.

According to an embodiment of the present invention, when $(N-1) \geq M \geq 2$ is true, the light source control unit is configured to change stepwise proportions of light emission levels of the M light emitting sources by power modulation while not changing total exposure energy of the M light emitting sources and thereby to shift the centroid of the pixel in the sub scanning direction.

According to an embodiment of the present invention, when $(N-1) \geq M \geq 2$ is true, the light source control unit is configured to change stepwise proportions of light emission time and proportions of light emission levels of the M light emitting sources by performing pulse width modulation and power modulation at the same time and thereby to shift the centroid of the pixel in the sub scanning direction.

The above embodiments make it possible to shift the centroid of a pixel in the sub scanning direction.

Also, the above embodiments make it possible to correct the position of a pixel smoothly in the sub scanning direction with a resolution higher than the density of light sources.

According to an embodiment of the present invention, the light source control unit includes a function to select M light emitting sources to be caused to emit light out of the N light sources individually for each of the L pixels.

The above embodiment makes it possible to precisely (with an accuracy higher than the size of a pixel) correct the position of each pixel individually.

According to an embodiment of the present invention, the light source control unit includes a function to change configurations of the L virtual light source arrays.

According to an embodiment of the present invention, the plural light sources include extra light sources in addition to N×L light sources.

According to an embodiment of the present invention, at least N−1 extra light sources are provided so that N−1 extra virtual light sources aligned in the sub scanning direction are appended to either end of an array of N×L virtual light sources formed in the sub scanning direction by the N×L light sources.

According to an embodiment of the present invention, at least 2×(N−1) said extra light sources are provided so that N−1 extra virtual light sources aligned in the sub scanning direction are appended to each end of an array of N×L virtual light sources formed in the sub scanning direction by the N×L light sources.

The above embodiments make it possible to accurately set the position of a pixel.

According to an embodiment of the present invention, surface emitting lasers are used as the plural light sources.

A light scanning apparatus using surface emitting lasers consume less electricity than a light scanning apparatus using conventional semiconductor lasers. Also, using surface emitting lasers makes it easier to form an array of light sources, thereby making it possible to simplify the structure of a light source unit and to reduce the production cost.

An embodiment of the present invention provides an image forming apparatus including a light scanning apparatus of an embodiment of the present invention.

The above embodiment provides an image forming apparatus that can form a high-quality image.

An embodiment of the present invention provides a color image forming apparatus including a light scanning apparatus of an embodiment of the present invention.

The above embodiment provides a color image forming apparatus that can form a high-quality image.

The present invention is not limited to the specifically disclosed embodiments, and variations and modifications may be made without departing from the scope of the present invention.

The present application is based on Japanese Priority Application No. 2006-065154 filed on Mar. 10, 2006, and Japanese Priority Application No. 2006-209840 filed on Aug. 1, 2006, the entire contents of which are hereby incorporated herein by reference.

The invention claimed is:

1. A light scanning apparatus having plural light sources, comprising:
    a light source control unit configured to control the light sources to form L (L≧2) light beam arrays aligned in a sub scanning direction each of which L light beam arrays are formed by causing M ((N−1) M≧1) light sources out of N (N≧2) light sources assigned to each of the L light beam arrays to emit light as M light emitting sources, wherein each of the L light beam arrays forms a pixel and a total of L pixels aligned in the sub scanning direction are formed; and
    a pixel-position-in-sub-scanning-direction detecting unit configured to detect a position of a pixel in the sub scanning direction and to generate correction data containing information to correct a position of a centroid of the pixel in the sub scanning direction, wherein the light source control unit is configured to control the M light emitting sources to shift the centroid of the pixel a distance in the sub scanning direction according to the correction data generated by the pixel-position-in-sub-scanning-direction detecting unit.

2. The light scanning apparatus as claimed in claim 1, wherein, when (N−1)≧M≧2 is true, scanning positions of the M light emitting sources are adjacent to each other in the sub scanning direction.

3. The light scanning apparatus as claimed in claim 1, wherein, when (N−1)≧M≧2 is true, the light source control unit is configured to change stepwise proportions of light emission time of the M light emitting sources by pulse width modulation while not changing total light emission time or a total exposure area of the M light emitting sources and thereby to shift the centroid of the pixel in the sub scanning direction.

4. The light scanning apparatus as claimed in claim 1, wherein, when $(N-1) \geqq M \geqq 2$ is true, the light source control unit is configured to change stepwise proportions of light emission levels of the M light emitting sources by power modulation while not changing total exposure energy of the M light emitting sources and thereby to shift the centroid of the pixel in the sub scanning direction.

5. The light scanning apparatus as claimed in claim 1, wherein, when $(N-1) \geqq M \geqq 2$ is true, the light source control unit is configured to change stepwise proportions of light emission time and proportions of light emission levels of the M light emitting sources by performing pulse width modulation and power modulation at the same time and thereby to shift the centroid of the pixel in the sub scanning direction.

6. The light scanning apparatus as claimed in claim 1, wherein the light source control unit includes a function to select M light emitting sources to be caused to emit light out of the N light sources individually for each of the L pixels.

7. The light scanning apparatus as claimed in claim 1, wherein the light source control unit includes a function to change configurations of the L light beam arrays.

8. The light scanning apparatus as claimed in claim 7, wherein the light sources include extra light sources in addition to N×L light sources.

9. The light scanning apparatus as claimed in claim 8, wherein at least N−1 said extra light sources are provided so that scanning positions of the N−1 said extra light sources are aligned in the sub scanning direction next to either end of an array of N×L scanning positions of the N×L light sources which N×L scanning positions are aligned in the sub scanning direction.

10. The light scanning apparatus as claimed in claim 8, wherein at least 2×(N−1) said extra light sources are provided so that scanning positions of a half of the 2×(N−1) said extra light sources are aligned in the sub scanning direction next to each end of an array of N×L scanning positions of the N×L light sources which N×L scanning positions are aligned in the sub scanning direction.

11. The light scanning apparatus as claimed in claim 1, wherein surface emitting lasers are used as the light sources.

12. An image forming apparatus including the light scanning apparatus as claimed in claim 1.

13. A color image forming apparatus including the light scanning apparatus as claimed in claim 1.

14. A light scanning method using plural light sources, comprising:
controlling the light sources to form L ($L \geqq 2$) light beam arrays aligned in a sub scanning direction each of which L light beam arrays are formed by causing M ($(N-1) \geqq M \geqq 1$) light sources out of N ($N \geqq 2$) light sources assigned to each of the L light beam arrays to emit light as M light emitting sources, wherein each of the L light beam arrays forms a pixel and a total of L pixels aligned in the sub scanning direction are formed;
detecting a position of a pixel in the sub scanning direction;
generating correction data containing information to correct a position of a centroid of the pixel in the sub scanning direction; and
controlling the M light emitting sources to shift the centroid of the pixel a distance in the sub scanning direction according to the correction data.

15. A recording medium having a program embodied therein for causing a computer to control plural light sources, said program comprising:
a light source control code unit configured to control the light sources to form L ($L \geqq 2$) light beam arrays aligned in a sub scanning direction each of which L light beam arrays are formed by causing M ($(N-1) \geqq M \geqq 1$) light sources out of N ($N \geqq 2$) light sources assigned to each of the L light beam arrays to emit light as M light emitting sources, wherein each of the L light beam arrays forms a pixel and a total of L pixels aligned in the sub scanning direction are formed; and
a pixel-position-in-sub-scanning-direction detecting code unit configured to detect a position of a pixel in the sub scanning direction and to generate correction data containing information to correct a position of a centroid of the pixel in the sub scanning direction, wherein the light source control code unit is configured to control the M light emitting sources to shift the centroid of the pixel a distance in the sub scanning direction according to the correction data generated by the pixel-position-in-sub-scanning-direction detecting code unit.

* * * * *